United States Patent
Bai et al.

(10) Patent No.: US 7,951,746 B2
(45) Date of Patent: *May 31, 2011

(54) BULK GROUP VIII/GROUP VIB METAL CATALYSTS AND METHOD OF PREPARING SAME

(75) Inventors: Chuansheng Bai, Phillipsburg, NJ (US); El-Mekki El-Malki, Falls Church, VA (US); Jeff Elks, Easton, PA (US); Zhiguo Hou, Nazareth, PA (US); Jon M. McConnachie, Annandale, NJ (US); Pallassana S. Venkataraman, Nazareth, PA (US); Jason Wu, Clinton, NJ (US); Jun Han, Sunnyvale, CA (US); Daniel Giaquinta, Saratoga, CA (US); Alfred Hagemeyer, Rheine (DE); Valery Sokolovskii, Sunnyvale, CA (US); Anthony F. Volpe, Jr., Sunnyvale, CA (US); David Michael Lowe, Sunnyvale, CA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 112 days.

This patent is subject to a terminal disclaimer.

(21) Appl. No.: 11/973,505

(22) Filed: Oct. 9, 2007

(65) Prior Publication Data
US 2008/0132407 A1 Jun. 5, 2008

Related U.S. Application Data

(60) Provisional application No. 60/850,849, filed on Oct. 11, 2006, provisional application No. 60/873,326, filed on Dec. 7, 2006.

(51) Int. Cl.
*B01J 27/047* (2006.01)
*B01J 27/051* (2006.01)
*B01J 21/18* (2006.01)
*B01J 31/00* (2006.01)

(52) U.S. Cl. ........ 502/220; 502/114; 502/150; 502/168; 502/167; 502/180; 50/182; 50/185; 50/216; 50/219; 50/221

(58) Field of Classification Search .................. 502/114, 502/150, 168, 167, 180, 182, 185, 216, 219, 502/220, 221
See application file for complete search history.

(56) References Cited

U.S. PATENT DOCUMENTS

| | | | |
|---|---|---|---|
| 3,615,207 A | 10/1971 | Lee | |
| 4,902,404 A * | 2/1990 | Ho | .................................. 208/57 |
| 5,122,258 A | 6/1992 | Eadie et al. | |
| 2006/0060502 A1 * | 3/2006 | Soled et al. | ................. 208/111.3 |

FOREIGN PATENT DOCUMENTS

EP 0 189 633 A1 6/1986
(Continued)

OTHER PUBLICATIONS

Yoshimura Y. et al. "Preparation of nickel-tungstate catalysts by a novel impregnation method", Catalysis Today, Elsevier, vol. 29, No. 1-4, May 31, 1996, pp. 221-228, XP009126328, ISSN: 0920-5861.

*Primary Examiner* — Elizabeth D Wood

(57) ABSTRACT

Bulk metallic catalysts comprised of a Group VIII metal and a Group VIB metal and methods for synthesizing bulk metallic catalysts are provided. The catalysts are prepared by a method wherein precursors of both metals are mixed and interacted with at least one organic acid, such as glyoxylic acid, dried, calcined, and sulfided. The catalysts are used for hydroprocessing, particularly hydrodesulfurization and hydrodenitrogenation, of hydrocarbon feedstocks.

19 Claims, 25 Drawing Sheets

FOREIGN PATENT DOCUMENTS

| JP | 1995-190280 | 10/1993 |
| WO | WO 96/41848 | 12/1996 |
| WO | WO 02/04117 A1 | 1/2002 |
| WO | WO 2007/070394 * | 6/2007 |

* cited by examiner

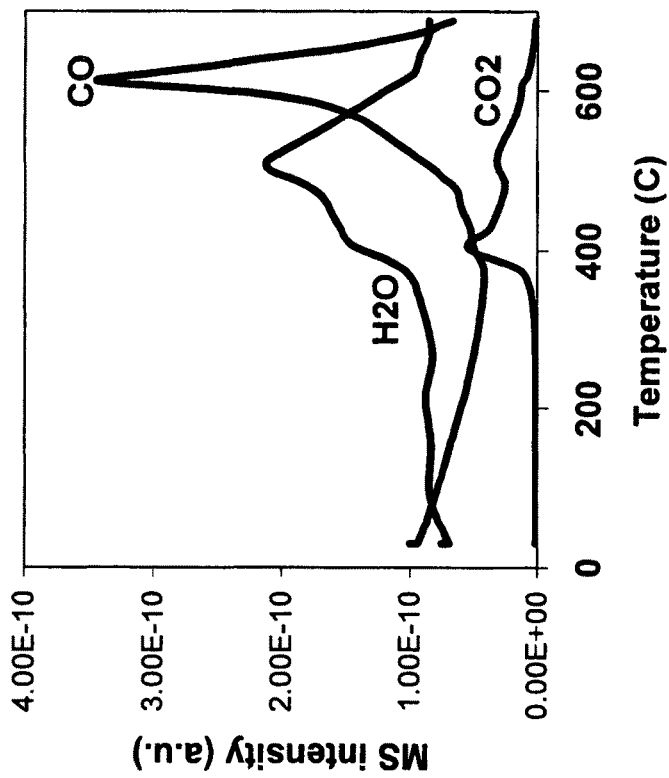
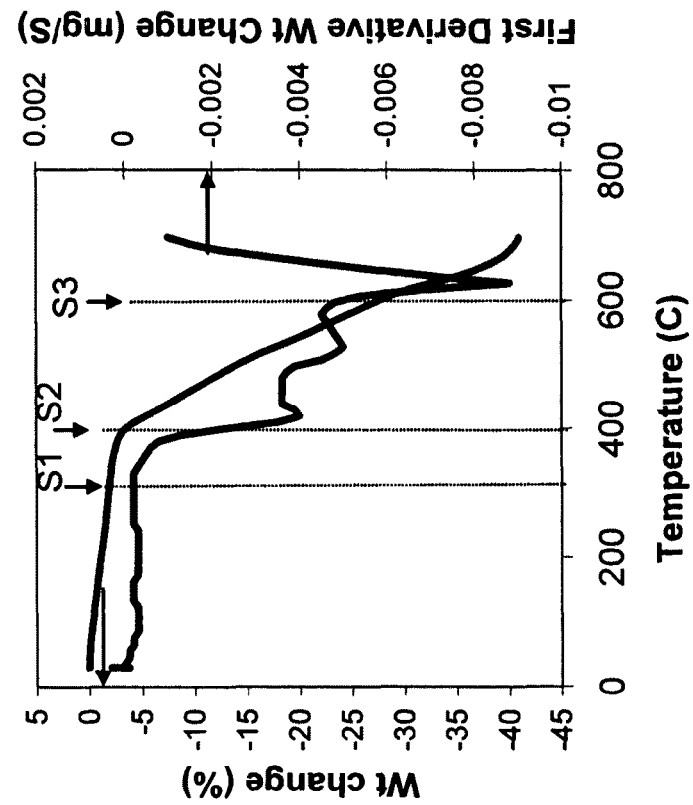
Figure 3a
Figure 3b

Coordinate carboxylate group

BULK GROUP VIII/GROUP VIB METAL CATALYSTS AND METHOD OF PREPARING SAME

This application claims the benefit of U.S. Provisional Applications 60/850,849 filed Oct. 11, 2006 and 60/873,326 filed Dec. 7, 2006.

FIELD OF THE INVENTION

This invention relates to a bulk metallic catalyst and a corresponding catalyst precursor comprised of at least one Group VIII metal and at least one Group VIB metal. The catalysts are prepared by a method wherein reagents containing the Group VIII and Group VIB metals, such as metal salts, are mixed with at least one organic complexing agent, such as an organic acid. The resulting mixture is heated and sulfided. The catalysts can be used for hydroprocessing, particularly hydrodesulfurization and hydrodenitrogenation, of hydrocarbon feedstocks.

BACKGROUND OF THE INVENTION

Increasingly stringent environmental regulations will require significant reductions in the sulfur content of transportation fuels. For example, by the end of this decade, maximum sulfur levels for distillate fuel will be limited to 10 wppm in Europe and Japan and 15 wppm in North America. To meet these ultra-low sulfur requirements without expensive modifications to existing refineries, it will be necessary to design a new generation of catalyst that has very high activity for desulfurization, particularly for distillate fuels at low to medium pressure.

In one approach, a family of compounds, related to hydrotalcites, e.g., ammonium nickel molybdates, has been prepared. Whereas X-ray diffraction analysis has shown that hydrotalcites are composed of layered phases with positively charged sheets and exchangeable anions located in the galleries between the sheets, the related ammonium nickel molybdate phase has molybdate anions in interlayer galleries bonded to nickel oxyhydroxide sheets. See, for example, Levin, D., Soled, S. L., and Ying, J. Y., Crystal Structure of an Ammonium Nickel Molybdate prepared by Chemical Precipitation, Inorganic Chemistry, Vol. 35, No. 14, p. 4191-4197 (1996). The preparation of such materials also has been reported by Teichner and Astier, Appl. Catal. 72, 321-29 (1991); Ann. Chim. Fr. 12, 337-43 (1987), and C. R. Acad. Sci. 304 (II), #11, 563-6 (1987) and Mazzocchia, Solid State Ionics, 63-65 (1993) 731-35.

Another approach is disclosed in U.S. Pat. Nos. 6,162,350; 6,652,738, 6,635,599 and 6,534,437, which relates to a family of bulk Group VIII/Group VIB trimetallic catalysts for the removal of sulfur from distillate fuels. The preferred trimetallic catalysts are comprised of Ni—Mo—W and are prepared from a variety of catalyst precursor compounds.

While some of the above mentioned catalysts have met with varying degrees of success, there is still a need in the art for ever more active catalysts to produce transportation fuels having ultra-low levels of sulfur, particularly for low pressure hydrotreating, e.g. a hydrogen partial pressure of less than 500 psig or less than 1000 psig.

SUMMARY OF THE INVENTION

In an embodiment, a bulk metallic catalyst precursor composition is provided comprising a Group VIII metal, a Group VIB metal, and from about 10 wt. % to about 60 wt. % of an organic compound-based component, the catalyst precursor composition having a surface area of 16 $m^2/g$ or less, preferably 10 $m^2/g$ or less, based on BET. In another embodiment, a sulfided catalyst is provided that is formed by sulfiding the above bulk metallic catalyst precursor composition.

In still another embodiment, a method for preparing a bulk metallic Group VIII/Group VIB catalyst precursor is provided. The method includes combining at least one Group VIII metal reagent and at least one Group VIB metal reagent with at least one organic complexing agent, thereby forming a mixture. The mixture is heated to a temperature between about 250° C. and about 450° C. to form a catalyst precursor containing at least 10 wt % carbon. The catalyst precursor is then sulfided under sulfiding conditions to produce a sulfided catalyst containing at least 10 wt % carbon.

In yet another embodiment, a method for hydroprocessing a hydrocarbon feedstock is provided. The method includes contacting said feedstock with a sulfided bulk metallic catalyst, the sulfided bulk metallic catalyst formed by sulfiding a catalyst precursor, the catalyst precursor comprising a Group VIII metal, a Group VIB metal, and from about 10 wt. % to about 60 wt. % of an organic compound-based component, the catalyst precursor composition having a surface area of 16 $m^2/g$ or less, preferably 10 $m^2/g$ or less, based on BET.

In still another embodiment, a catalyst precursor composition is provided that includes a Group VIII metal, a Group VIB metal, carbon, and oxygen, the carbon content being from about 10 wt % to about 25 wt %, the ratio of Group VIII to Group VIB metal being from about 0.2 to about 0.6, the surface area of the composition being about 10 $m^2/g$ or less.

In yet another embodiment, a bulk metallic catalyst is provided comprising a Group VIII metal, a Group VIB metal, and at least about 10 wt. % of an organic compound-based component, wherein at least a portion of the Group VIB metal is in the form of stacks of metal sulfide having a stack height of from about 1.2 to about 2.0.

In still other embodiments, methods of use for the catalysts described above are provided.

BRIEF DESCRIPTION OF DRAWINGS

FIGS. 3a and 3b provide data related to a Temperature Programmed Reduction ($H_2$-TPR) analysis of a catalyst precursor according to an embodiment of the invention.

DETAILED DESCRIPTION OF THE INVENTION

The catalysts of the present invention are different than conventional catalysts typically used for hydroprocessing, such as hydrodesulfurization (HDS). The conventional method for improving HDS activity of a catalyst involving a Group VIB and a Group VIII metal, such as a CoMo catalyst, is to deposit the Group VIB and Group VIII active components on an alumina support. This can increase the dispersion of the active components and generate additional HDS activity. By contrast, the catalysts according to the invention are bulk catalysts formed by heating a catalyst precursor comprised of about 40 wt. % to about 90 wt. % of a Group VIII metal and a Group VIB metal, based on the total weight of the bulk catalyst particles. The weight of metal is measured as metal oxide. The balance of the catalyst precursor weight is an organic compound-based material. In an embodiment, the Group VIB metal is Mo or W. In another embodiment, the Group VIII metal is Co or Ni. In still another embodiment, the Group VIB metal is Mo and the Group VIII metal is Co. In yet another embodiment, the Group VIII metal is a non-noble metal.

Based on X-ray diffraction, it appears that the Group VIII metals and the Group VIB metals in the catalyst precursor after heating do not have the long range ordering typically found in materials that are primarily a crystalline oxide. Instead, in some embodiments it appears that the metals are complexed by the organic complexing agent in the catalyst precursor. The metals are complexed by the organic complexing agent when the metals and complexing agent are mixed together. The nature of the complex may change after one or more heating steps, as the organic complexing agent may undergo one or more conversions or reactions to form an organic compound-based component. In an alternative embodiment, the catalyst precursor can have some crystalline or nanocrystalline characteristics (based on XRD) in addition to having characteristics of metals that are complexed by the organic complexing agent.

Figure 4:
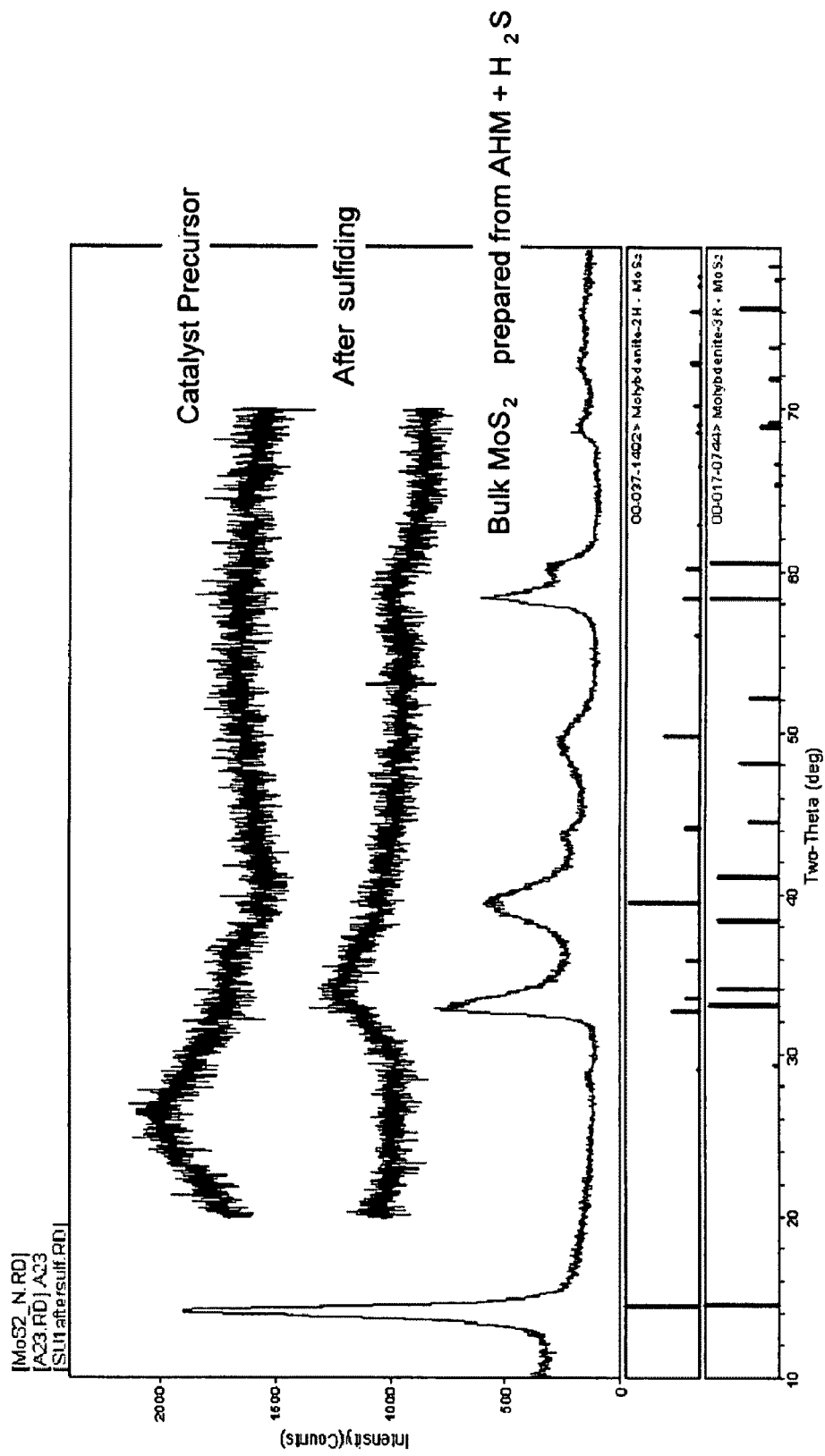
FIG. 4 provides XRD patterns of a catalyst precursor and sulfided catalyst according to an embodiment of the invention.

The X-ray Diffraction data provided in FIG. 4 of this application was generated under the following conditions. X-ray powder diffraction analyses of the samples were obtained using a PANalytical X-pert PRO MPD, manufactured by PANalytical, Inc., and equipped with a X-Cellerator detector. The 2 theta scan used a Cu target at 45 kV and 40 mA. The diffraction patterns were taken in the range of 20° to 70° and 20° to 70° 2θ. The step size was 0.2 degrees and the time/step was 480 seconds. The remaining X-ray Diffraction data and patterns provided in this application were generated under the following conditions. X-ray powder diffraction analyses of the samples were obtained using a Bruker D4 Endeavor, manufactured by Bruker AXS and equipped with a Vantec-1 high-speed detector. The 2 theta scan used a Cu target at 35 kV and 45 mA. The diffraction patterns were taken in the range of 2° to 70° 2θ. The step size was 0.01794 degrees and the time/step was 0.1 second.

In this application, an "amorphous" catalyst or catalyst precursor refers to a catalyst or catalyst precursor that lacks the long range order or periodicity to have peaks in X-ray diffraction spectra that can be sufficiently distinguished from the background noise in the spectra, such as by determining a ratio of peak intensity versus background noise. Nanocrystalline catalyst or catalyst precursor refers to catalyst or catalyst precursor that has some crystallinity but with a grain size of less than 100 nm. This determination is made using X-ray diffraction spectra generated according to the conditions described above. Broadening of X-ray spectra occurs increasingly as particle sizes shrink, such as when grain sizes are <100 nm, resulting in an XRD pattern with broadened or apparently non-existent peaks. It is also possible that amorphous or nanocrystalline phases can include crystalline phases with grain sizes of >100 nm that are resolvable in the XRD. Without being bound by any particular theory, it is believed that the high activity of the catalyst systems according to various embodiments of the invention results from an amorphous and/or nanocrystalline component.

In an embodiment, the bulk catalyst particles according to the invention, formed by sulfidation of catalyst precursor particles, can have a characteristic X-ray diffraction pattern of an amorphous material. Generally, it is believed that the long range ordering typically found in crystalline phases of Group VIII and Group VIB metal oxides and/or sulfides are not present in bulk catalysts formed according to the invention. In particular, XRD spectra of catalysts and catalyst precursors according to the invention either do not show crystalline phases of CoMo oxides, or alternatively only weakly show the crystalline CoMo oxide character. Without being bound by any particular theory, it is believed that the organic complexing agent and/or the resulting organic compound-based component interrupts or inhibits crystallization of oxides of the Group VIB and Group VIII metals. Instead of forming crystalline oxides with long range ordering, it is believed that at least a portion of the bulk catalyst particles have a structure that continues to involve some sort of complex with an organic compound-based component. This structure may be amorphous and/or crystalline on a length scale that is not readily resolved by XRD. The nature of the complexation may differ from the complexation present in the catalyst precursor. Additionally, at least a portion of the metals present in the catalyst can be in the form of metal sulfides, as opposed to complexed metals or amorphous/small crystal metal oxides.

The bulk catalyst precursor compositions of the invention, obtained by mixing of metal reagents with an organic complexing agent and then heating and/or mixing, have a relatively low surface area (measured by Brunauer-Emett-Teller method, or BET) of about 16 m²/g or less. In another embodiment, the bulk catalyst precursor compositions have a surface area (measured by BET) of less than about 10.0 m²/g, or less than about 9.0 m²/g, or less than about 7.5 m²/g, or less than about 5.0 m²/g, or less than about 4.0 m²/g, or less than about 3.0 m²/g, or less than about 2.5 m²/g. In still another embodiment, the bulk catalyst precursor compositions have a surface area of at least about 0.05 m²/g, or at least about 0.1 m²/g, or at least about 0.25 m²/g. In a preferred embodiment, the bulk catalyst precursor compositions have a surface area of from about 0.1 m²/g to about 10.0 m²/g.

The molar ratio of Group VIII metal to Group VIB metal ranges generally from about 1 to 10 to about 10 to 1. Expressed as a fractional value, the molar ratio is generally from about 0.1 to about 10. Preferably, the ratio of Group VIII metal to Group VIB metal is less than about 3, and more preferably less than about 2. Preferably, the ratio of Group VIII metal to Group VIB metal is greater than about 0.33, and more preferably greater than about 0.5.

It is within the scope of this invention that the catalyst compositions also contain any additional component that is conventionally present in hydroprocessing catalysts such as an acidic component, e.g. phosphorus or boron compounds, additional transition metals, rare earth metals, main group metals such as Si or Al, or mixtures thereof. Suitable additional transition metals are, e.g. rhenium, ruthenium, rhodium, iridium, chromium, vanadium, iron, platinum, palladium, cobalt, nickel molybdenum, zinc, niobium, or tungsten. All these metals are generally present in the sulfided form if the catalyst composition has been sulfided. Prior to sulfidation, at least a portion of one or more metals can be complexed by the organic compound-based material in the catalyst precursor. After sulfidation, it is believed that at least a portion of the sulfided metals are still somehow directly or indirectly bound to the organic compound-based material (e.g., carbon) in the catalyst.

The bulk metallic catalysts of the present invention are prepared by the controlled heating of Group VIII and Group VIB precursor compounds that are complexed with an organic complexing agent, preferably in the form of an organic acid. Preferably, the organic complexing agent is a metal binding group or chelating agent. Preferably, the organic complexing agent is a bidentate ligand. Preferably, the organic complexing agent is suitable for forming metal-ligand complexes in solution.

In an embodiment where the catalyst precursor is formed from a solution containing the Group VIII metal, Group VIB metal, and organic complexing agent, it is preferred that both the Group VIII compound and the Group VIB compound be water soluble salts in the appropriate predetermined concentration to yield the desired molar ratios as mentioned above. The more preferred Group VIII metals are Co and Ni, with Co being the most preferred. Preferably, the Group VIII metals are non-noble metals. The more preferred Group VIB metals are Mo and W, with Mo being the most preferred. Non-limiting examples of suitable Co precursor compounds include carbonates, nitrates, sulfates, acetates, chlorides, hydroxides, propionates, glycinates, hydroxycarbonates, acetyl acetates, acetyl acetonates, metallic Co(0), Co oxides, Co hydrated oxides, Co carboxylates (in particular Co glyoxylate), Co citrate, Co gluconate, Co tartrate, Co glycine, Co lactate, Co naphthenate, Co oxalate, Co formate, and mixtures thereof, including ammonium or amine forms of the above. Preferred molybdenum and tungsten precursor compounds include alkali metal or ammonium molybdate (also peroxo-, di-, tri-, tetra-, hepta-, octa-, or tetradecamolybdate), molybdic acid, phosphomolybdic acid, phosphotungstic acid, Mo-P heteropolyanion compounds, W-Si heteropolyanion compounds, Co-Mo-W heteropolyanion compounds, alkali metal or ammonium tungstates (also meta-, para-, hexa-, or polytungstate), acetyl acetonates, and mixtures thereof. In still other embodiments, any suitable Group VIII or Group VIB metal reagent can be used to prepare Group VIII or Group VIB metal solutions.

Organic acids are a preferred class of organic complexing agent. Non-limiting examples of organic complexing agents suitable for use herein include pyruvic acid, levulinic acid, 2-ketogulonic acid, keto-gluconic acid, thioglycolic acid, 4-acetylbutyric acid, 1,3-acetonedicarboxylic acid, 3-oxo propanoic acid, 4-oxo butanoic acid, 2,3-diformyl succinic acid, 5-oxo pentanoic acid, 4-oxo pentanoic acid, ethyl glyoxylate, glycolic acid, glucose, glycine, oxamic acid, glyoxylic acid 2-oxime, ethylenediaminetetraacetic acid, nitrilotriacetic acid, N-methylaminodiacetic acid, iminodiacetic acid, diglycolic acid, malic acid, gluconic acid, acetylacetone, and citric acid. Preferred organic acids are glyoxylic acid, oxalacetic acid, 2-ketogulonic acid, alpha-ketoglutaric acid, 2-ketobutyric acid, pyruvic acid, keto-gluconic acid, thioglycolic acid, and glycolic acid. Most preferred are glyoxylic acid and oxalacetic acid.

In another embodiment, the organic complexing agent is an organic acid that contains a —COOH functional group and at least one additional functional group selected from carboxylic acid —COOH, hydroximate acid —NOH—C=O, hydroxo —OH, keto —C=O, amine —NH2, amide: —CO—NH2, imine: —CNOH, epoxy: =COC=, or thiol: —SH. Preferably, the organic complexing agent is a bidentate ligand.

The process for preparing the catalysts of the present invention comprises multiple steps. The first step is a mixing step wherein at least one Group VIII metal reagent, at least one Group VIB metal reagent, and at least one organic complexing agent are combined together. In an embodiment, one or more of the metal reagents and organic complexing agent can be provided in the form of solutions, such as aqueous solutions. In another embodiment, one or more of the metal reagents and organic complexing agent can be provided in the form of slurries. In still another embodiment, one or more of the metal reagents and organic complexing agent can be provided in the form of a solid material. Those of skill in the art will recognize that still other forms of providing the organic complexing agent and metal reagent are possible, and that any suitable form (solution, slurry, solid, etc.) can be used for each individual reagent and/or organic complexing agent in a given synthesis.

The metal reagents and organic complexing agent are mixed together to form a precursor mixture. In an embodiment where one or more of the metal reagents or organic complexing agent are provided as a solution or slurry, mixing can involve adding the metal reagents and organic complexing agent to a single vessel. If one or more of the metal reagents and organic complexing agent are provided as solids, mixing can include heating the organic complexing agent to a sufficient temperature to melt the complexing agent. This will allow the organic complexing agent to solvate any solid metal reagents.

The temperature during mixing is preferably from ambient temperature to the boiling point of the solvent. The preparation can be performed in any suitable way. For example, in embodiments involving solutions and/or slurries, separate solutions (or slurries) can be prepared from each of the catalytic components. That is, a Group VIII metal compound in a suitable solvent and a Group VIB metal in a suitable solvent can be formed. Non-limiting examples of suitable solvents include water and the $C_1$ to $C_3$ alcohols. Other suitable solvents can include polar solvents such as alcohols, ethers, and amines. Water is a preferred solvent. It is also preferred that the Group VIII metal compound and the Group VIB compound be water soluble and that a solution of each be formed, or a single solution containing both metals be formed. The organic complexing agent can be prepared in a suitable solvent, preferably water. The three solvent components can be mixed in any sequence. That is, all three can be blended together at the same time, or they can be sequentially mixed in any order. In an embodiment, it is preferred to first mix the two metal components in an aqueous media, than add the organic complexing agent.

The process conditions during the mixing step are generally not critical. It is, e.g., possible to add all components at ambient temperature at their natural pH (if a suspension or solution is utilized). It is generally preferred to keep the temperature below the boiling point of water, i.e., 100° C. to ensure easy handling of the components during the mixing step. However, if desired, temperatures above the boiling point of water or different pH values can be used. In an embodiment where the organic complexing agent is an acid or base having a conjugate base/acid, the pH of the mixture can be adjusted to drive the acid/base equilibrium toward a desired form. For example, if the organic complexing agent is an acid, the pH of the solution can be raised to drive the equilibrium toward formation of more of the conjugate base. If the reaction during the mixing step is carried out at increased temperatures, the suspensions and solutions that are added during the mixing step are preferably preheated to an increased temperature which can be substantially equal to the reaction temperature.

The amount of metal precursors and organic complexing agent in the mixing step should be selected to achieve preferred ratios of metal to organic compound-based material in the catalyst precursor after heating. These preferred ratios result in highly active bulk catalysts. For example, the ratio of organic acid to total metal in the mixed solution (or other mixture of metal reagents and organic complexing agent) should reach a minimum level that results in a highly active catalyst.

In an embodiment, the amount of organic complexing agent used in the mixed solution should be enough to provide at least about 10 wt % of organic compound-based material in the catalyst precursor formed after heating, or at least about 20 wt %, or at least about 25 wt %, or at least about 30 wt %. In another embodiment, the amount of organic complexing agent used in the mixed solution should provide less than about 60 wt % of organic compound-based material in the catalyst precursor formed after heating, or less than about 40 wt %, or less than about 35 wt %, or less than about 30 wt %. Preferably, the amount of organic complexing agent used in the mixed solution is enough to provide between about 20 wt % and about 35 wt % of organic compound-based material in the resulting catalyst precursor. A desired amount of organic compound-based material in the catalyst precursor can be achieved based on the amount of organic complexing agent to metal ratio in the mixed solution and based on the thermal activation conditions used to form the catalyst precursor. The term "organic compound-based material" refers to the carbon containing compound present in either the catalyst precursor after heating, or in the catalyst after sulfidation. The organic compound-based material is derived from the organic complexing agent, but may be modified due to heating of the catalyst precursor and/or sulfidation of the precursor to form the catalyst. Note that the eventual form of the organic compound-based material may include carbon not traditionally considered as "organic", such as graphitic or amorphous carbon. The term organic compound-based material used here specifies only that the carbon was derived originally from the organic complexing agent and/or another organic carbon source used in forming the catalyst precursor.

For this invention, the weight percentage of organic compound-based material in the catalyst precursor was determined by performing a Temperature Programmed Oxidation on the catalyst precursor under the following conditions. Temperature Programmed Oxidation using TGA/MS was performed on dried and heated samples. The TGA/MS data was collected on a Mettler TGA 851 thermal balance which was interfaced with a quadrupole mass spectrometer equipped with a secondary electron multiplier. Between 20 and 25 mg of sample was heated at 4° C./min from ambient temperature to 700° C. in flowing 14.3% $O_2$ in He (77 cc/min) at one atmosphere total pressure. In the TGA/MS experiments, the effluent gas was carried over to the MS instrument via a capillary line and specific m/e fragments such as 18 ($H_2O$), 44 ($CO_2$), 64 ($SO_2$) were analyzed as markers for the decomposition products and qualitative correlation with gravimetric/heat effects.

The weight percentage of material lost during a TPO procedure represents the weight percentage of organic compound-based material. The remaining material in the catalyst precursor is considered to be metal in the form of some type of oxide. For clarity, the weight percent of metal present in the catalyst precursor is expressed as metal oxide in the typical oxide stoichiometry. For example, weights for cobalt and molybdenum are calculated as $CoO$ and $MoO_3$, respectively.

A similar calculation can be performed to determine the weight percentage of organic compound-based component in the catalyst formed after sulfidation. Once again, the weight percent of organic compound-based component is determined by TPO, according to the method described above. The remaining weight in the catalyst corresponds to metal in some form, such as oxide, oxysulfide, or sulfide.

The amount of organic complexing agent used in the mixed solution should also be enough to form metal-organic complexes in the solution under reaction conditions. In an embodiment where the complexing agent is an organic acid, the ratio of carboxylic acid groups of the organic acids to metals can be at least about 1 (meaning that about the same number of carboxylic acid groups and metal atoms are present), or at least about 2, or at least about 3. In another embodiment, the ratio of carboxylic acid groups to metals can be 12 or less, or 10 or less, or 8 or less.

In another embodiment, the molar ratio used in the mixing solution of organic complexing agent to metals is about 6.0 or less, or about 5.5 or less, or about 5.0 or less, or about 4.8 or less, or about 4.6 or less. In another embodiment, the molar ratio used in the mixing solution of organic complexing agent to metals is about 1.5 or more, or about 2 or more, or about 2.5 or more, or about 3.0 or more, or about 3.5 or more.

In a preferred embodiment, the molar ratio of the Group VIII metal to the Group VIB metal is at least about 0.1, or at least about 0.2, or at least about 0.33, or at least about 0.5. In another preferred embodiment, the molar ratio of the Group VIII metal to the Group VIB metal is about 0.9 or less, or about 0.6 or less.

The second step in the process for preparing the catalysts of the present invention is a heating step. In an embodiment, the heating step is used to remove water from the mixture. In another embodiment, the heating step is used to form an organic compound-based component in the catalyst precursor. The organic compound-based component is the product of heating the organic complexing agent used in the mixing solution. The organic complexing agent may be substantially similar to the organic compound-based component, or the organic compound-based component may represent some type of decomposition product of the organic complexing agent. Alternatively, without being bound by any particular theory, heating of the organic complexing agent may result in cross linking of the complexing agent to form an organic compound-based component.

It is within the scope of this invention that the heating and/or drying be performed in multiple phases according to a heating profile. In an embodiment, the first phase of the heating profile is a partial drying phase, preferably performed at a temperature from about 40° C. to about 60° C. in a vacuum drying oven for an effective amount of time. An effective amount of time corresponds to a time sufficient to remove water to the point of gel formation. Typically it is believed a gel will form when from about 80% to about 90% of the water is removed. In embodiments where the mixture of the metal reagents and the organic complexing agent is in the form of a solution or slurry, it is preferred to agitate the mixture of metal reagents and organic complexing agent components at about ambient temperature for an effective period of time to ensure substantial uniformity and dissolution of all components prior to heating. Alternatively, in embodiments where the organic complexing agent is provided as a solid, an initial heating phase can correspond to heating used to melt the organic complexing agent. The temperature of the mixture can be maintained for an effective amount of time to allow the melted organic complexing agent to solvate and/or mix with the metal reagents.

In an embodiment, the next heating or drying phase in the heating profile is to raise the temperature to about 110° C. to about 130° C., preferably from about 110° C. to about 120° C., to drive off additional water to the point that high temperature heating can be done without causing boiling over and splashing of solution. At this point the gel will be transformed into a solidified material. The effective amount of time to form the dried material, that is from gel formation to solidified material, can be from seconds to hours, preferably from about 1 minute to several days, more preferably from about 1 minute to 24 hours, and still more preferably from about 5 minutes to about 10 hours. The gel, upon solidification and cooling to room temperature can also take the form of a black rubbery solid material. The gel or solidified material can be brought to ambient temperature and saved for future heating at higher temperatures. In the alternative, the gel or solidified material can be used as a catalyst precursor at this stage.

It is within the scope of this invention to grind the solid material to a powder before or after thermal activation. The grinding can take place prior to any heating steps at temperatures of about 275° C. or greater, or the grinding can take place after heating to about 275° C. or greater. Any suitable grinding technique can be used to grind the solid material.

The catalyst precursor can be subjected to a further heating stage to partially decompose materials within the catalyst precursor. This additional heating stage can be carried out at a temperature from about 100° C. to about 500° C., preferably from about 250° C. to about 450° C., more preferably from about 300° C. to about 400° C., and still more preferably from about 300° C. to about 340° C., for an effective amount of time. This effective amount of time will range from about 0.5 to about 24 hours, preferably from about 1 to about 5 hours. In another embodiment, heating can be accomplished by ramping the temperature in a furnace from room temperature to about 325° C. in one hour. In an embodiment, the heating (including possible decomposition) can be carried out in the presence of a flowing oxygen-containing gas such as air, a flowing inert gas such as nitrogen, or a combination of oxygen-containing and inert gases. In another embodiment, the heating can be carried out in the atmosphere present in the furnace at the beginning of the heating process. This can be referred to as a static condition, where no additional gas supply is provided to the furnace during heating. The atmosphere in the furnace during the static condition can be an oxygen-containing gas or an inert gas. It is preferred to carry out the heating in the presence of an inert gas atmosphere, such as nitrogen. Without being bound by any particular theory, the material resulting from this additional heating may represent a partial decomposition product of the organic complexing agent, resulting in the metals being complexed by an organic compound-based material or component.

As previously mentioned, the heating step can be performed in a variety of ways. The heating step can start with one or more initial heating stages at a lower temperature followed by heating at a temperature of about 275° C. or greater. In other embodiments, the heating profile can include only temperatures of about 130° C. or lower, or the heating profile can include immediately ramping the temperature to about 275° C. or greater, or about 325° C. or greater. Preferably, the preparation conditions can be controlled and designed so that the mixed solution does not go through violent evaporation, spill or interruption during the entire heating profile. Such embodiments typically involve an initial heating at a temperature below 100° C. However, in another embodiment, the heating profile can include conditions that lead to rapid evaporation while the catalyst precursor still contains a substantial amount of water. This can lead to boiling or splashing of the mixture used to form the catalyst precursor. While boiling or splashing of the mixture for forming the catalyst precursor is inconvenient, it is believed that catalyst precursor according to the invention will still be formed under these conditions.

In contrast to conventional hydroprocessing catalysts, which typically are comprised of a carrier impregnated with at least one Group VIII metal and at least one Group VIB metal, the catalysts of the present invention are bulk catalysts.

Without being bound by any particular theory, it is believed that the organic complexing agent and/or the resulting organic-compound based component plays a role in the unexpected high activity of the final catalysts. It is believed that the organic complexing agent and/or the resulting organic compound-based component either assists in stabilization of the metal particles and/or directly interacts with metal active sites and prevents the metal from agglomerating. In other words, the organic complexing agent and/or organic compound-based component enhances the dispersion of the active sites. When a catalyst precursor is formed with an amount of organic compound-based component that is less than the desired range, the activity of the resulting catalyst is lower.

A bulk powder catalyst precursor composition according to the invention, obtained after grinding and heating, can be directly formed into shapes suitable for a desired catalytic end use. Alternately, the bulk powder can be mixed with a conventional binder material then formed into the desired shapes. If a binder is used, it may be either introduced before or after decomposition (heating) of the mixture used to form the catalyst precursor. Examples of potential binders include Actigel clay, available from Active Minerals International of Hunt Valley, Md.; Nyacol 2034 DI, available from Nyacol Nano Technologies, Inc. of Ashland, Mass.; or a Si-resin, such as Q-2230 available from Dow Corning. In still another embodiment, a binder precursor, such as silicic acid, Si acetate, or Al acetate, may be added to the mixture used for synthesizing the catalyst precursor.

The third step in the preparation of the catalysts of the invention is a sulfidation step. Sulfidation is generally carried out by contacting the catalyst precursor composition with a sulfur containing compound, such as elemental sulfur, hydrogen sulfide or polysulfides. Sulfidation can also be carried out in the liquid phase utilizing a combination of a polysulfide, such as a dimethyl disulfide spiked hydrocarbon stream, and hydrogen. The sulfidation can be carried out subsequent to the preparation of the bulk catalyst composition but prior to the addition of a binder, if used.

If the catalyst composition is used in a fixed bed process, sulfidation is preferably carried out subsequent to the shaping step. Sulfidation may be carried out ex situ or in situ. For ex situ sulfidation, sulfidation is carried out in a separate reactor prior to loading the sulfided catalyst into the hydroprocessing unit. In situ sulfidation is preferred and for in situ sulfidation the sulfidation is carried out in the same reactor used for hydroprocessing.

In an embodiment, the sulfidation step can be a liquid sulfidation. In such an embodiment, the bulk catalyst can be sulfided by exposing the catalyst to a feedstock spiked with 1.36% by weight of dimethyl disulfide. Alternatively, the spiking level of dimethyl disulfide can be between 0.5 and 2.5% by weight. The catalyst can be exposed to the feed at a pressure of 500 psig at a LHSV of 1.0 and hydrogen flow rate of 700 scf/B. Preferably, the catalyst can be exposed to the feed for an initial period of time, such as 18 hours, at a temperature of 425° F. (218° C.), followed by a second period of time, such as 24 hours, at a temperature of 625° F. (329° C.). In other embodiments, other conventional methods of sulfidation can be used.

In another embodiment involving liquid sulfidation, the catalyst can be sulfided using temperature and pressure conditions that are more severe than the expected eventual processing conditions. For example, if the sulfided catalyst will be used for processing a feedstock at a pressure of 150 psig, the sulfidation can be performed at a higher pressure to reduce the time needed to achieve sulfidation of the catalyst.

In various embodiments, the catalyst formed after sulfidation is believed to have at least in part a structure involving complexation or another interaction of metals by/with an organic compound-based component. The nature of the organic compound-based component in the sulfided catalyst may differ from the organic compound-based component in the catalyst precursor and the organic complexing agent used in the initial mixture to form the catalyst precursor. Note that in the Examples below, the carbon and sulfur species in the sulfided catalyst appear to oxidize and leave the catalyst at a similar time in Temperature Programmed Oxidation studies. One possible interpretation for these TPO studies is the presence of a complex (or some other type of interaction) between the organic compound-based component and metals in at least a portion of the catalyst structure.

In an embodiment, the carbon content of the catalyst after sulfidation is at least 10 wt % or at least 12 wt %. In another embodiment, the carbon content of the catalyst after sulfidation is 25 wt % or less or 20 wt % or less.

After sulfidation, at least a portion of the metal in the catalyst will be in a sulfided form. In particular, the Group VIB metal will form stacks of sulfided metal believed to have a $MeS_2$ stoichiometry, where Me represents the Group VIB metal. For example, if Mo is the Group VIB metal, stacks of $MoS_2$ will be formed. In catalysts formed according to the invention, the average stack height of the sulfided Group VIB metal will be from about 1.2 to about 2. In another embodiment, the average stack height will be at least 1.2, or at least 1.3, or at least 1.4, or at least 1.5. In still another embodiment, the average stack height will be 2.2 or less, or 2.1 or less, or 2.0 or less, or 1.9 or less. Without being bound by any particular theory, it is believed that a lower stack height corresponds indirectly to increased activity.

The catalyst compositions of the present invention are particularly suitable for hydroprocessing hydrocarbon feeds. Examples of hydroprocessing processes include hydrogenation of unsaturates, hydrodesulfurization, hydrodenitrogenation, hydrodearomatization and mild hydrocracking. Preferred are hydrodesulfurization and hydrodenitrogenation. Conventional hydroprocessing conditions include temperatures from about 250° to 450° C., hydrogen pressures of from 5 to 250 bar, liquid hourly space velocities of from 0.1 to 10 $h^{-1}$, and hydrogen treat gas rates of from 90 to 1780 $m^3/m^3$ (500 to 10000 SCF/B).

Feedstocks on which the present invention can be practiced are those petroleum feedstreams boiling in the distillate range. This boiling range will typically be from about 140° C. to about 360° C. and includes middle distillates, and light gas oil streams. Non-limiting examples of preferred distillate streams include diesel fuel, jet fuel and heating oils. The feedstocks can contain a substantial amount of nitrogen, e.g. at least 10 wppm nitrogen, and even greater than 1000 wppm, in the form of organic nitrogen compounds. The feedstocks can also contain a significant sulfur content, ranging from about 0.1 wt. % to 3 wt. %, or higher.

The hydroprocessing of the present invention also includes slurry and ebullating bed hydrotreating processes for the removal of sulfur and nitrogen compounds, and the hydrogenation of aromatic molecules present in light fossil fuels, such as petroleum mid-distillates, particularly light catalytic cycle cracked oils (LCCO). Distillates derived from petroleum, coal, bitumen, tar sands, or shale oil are likewise suitable feeds. Hydrotreating processes utilizing a slurry of dispersed catalysts in admixture with a hydrocarbon feed are generally known. For example, U.S. Pat. No. 4,557,821 to Lopez et al discloses hydrotreating a heavy oil employing a circulating slurry catalyst. Other patents disclosing slurry hydrotreating include U.S. Pat. Nos. 3,297,563; 2,912,375; and 2,700,015. The slurry hydroprocessing process of this invention can be used to treat various feeds including mid-distillates from fossil fuels such as light catalytic cycle cracking oils (LCCO).

Hydrogenation conditions include reactions in the temperature range of about 100° C. to about 350° C. and pressures from about five atmospheres (506 kPa) and 300 atmospheres (30,390 kPa) hydrogen, for example, 10 to 275 atmospheres (1,013 kPa to 27,579 kPa). In one embodiment the temperature is in the range including 180° C. and 320° C. and the pressure is in the range including 15,195 kPa and 20,260 kPa hydrogen. The hydrogen to feed volume ratio to the reactor under standard conditions (25° C., 1 atmosphere pressure) will typically range from about 20-200, for water-white resins 100-200.

Process conditions applicable for the use of the catalysts described herein may vary widely depending on the feedstock to be treated. Thus, as the boiling point of the feed increases, the severity of the conditions will also increase.

The following table (Table 1) serves to illustrate typical conditions for a range of feeds.

TABLE 1

| FEED | TYPICAL BOILING RANGE ° C. | TEMP. ° C. | PRESS, BAR | SPACE VELOCITY V/V/HR | $H_2$ GAS RATE SCF/B |
|---|---|---|---|---|---|
| naphtha | 25-210 | 100-370 | 10-60 | 0.5-10 | 100-2,000 |
| diesel | 170-350 | 200-400 | 15-110 | 0.5-4 | 500-6,000 |
| heavy gas oil | 325-475 | 260-430 | 15-170 | 0.3-2 | 1000-6,000 |
| lube oil | 290-550 | 200-450 | 6-210 | 0.2-5 | 100-10,000 |
| residuum | 10-50% > 575 | 340-450 | 65-1100 | 0.1-1 | 2,000-10,000 |

While the invention described herein shows enhanced activity for hydrodenitrogenation, most HDN catalysts will also show hydrodesulfurization (HDS) and hydrogenation activities. Consequently, the catalysts and processes described herein will be useful on feeds containing both nitrogen and sulfur, and will be particularly useful on feeds high in nitrogen.

The following examples will serve to illustrate, but not limit this invention.

EXAMPLE 1

Catalyst Precursor Synthesis

Bulk CoMo catalysts were prepared by a controlled heating process according to an embodiment of the invention. A 1 M Mo aqueous solution was prepared by dissolving the appropriate amount of ammonium heptamolybdate tetrahydrate (AHM) in distilled water. A 1 M Co aqueous solution was also prepared by dissolving the appropriate amount of cobalt acetate tetrahydrate in distilled water. A 4.5 M glyoxylic acid solution was prepared by a 1:1 dilution with distilled water of 50% glyoxylic acid aqueous solution.

A mixture was prepared by mixing together appropriate amounts of the above three solutions. The resulting solution had a reddish color. The ratio of Mo to Co in the solution was 2:1. Two bulk catalyst precursor mixtures were prepared. One catalyst precursor mixture had a molar ratio of glyoxylic acid/(Mo+Co) of 4.8, and is designated Catalyst Precursor A. A second catalyst precursor mixture designated Catalyst Precursor B was prepared having a molar ratio of glyoxylic acid/(Mo+Co) of 6. The catalyst precursor mixtures were heated at 55° C. for about 4 hours, then at 120° C. for about an additional 4 hours. The result for each catalyst precursor was a black viscous substance. The black viscous substance was then cooled to room temperature wherein it solidified. The solidified black substance was ground to a powder and placed in a tube furnace whereupon the temperature was ramped from about room temperature to about 325° C. in one hour. The catalyst precursor compositions were then heated at a temperature of about 325° C. in air for about 4 hours.

Samples of the two catalyst precursor powders were crushed into fines using an agate mortar and pestle. A portion of the precursor powders were sulfided to produce catalyst powder.

The BET surface area and carbon content were measured for the catalyst precursor compositions of Catalyst Precursor A and Catalyst Precursor B as well as for a CoMo catalyst precursor prepared similarly, but without the use of an organic acid (Comparative Catalyst 1). The results are shown in Table 2 below. X-ray diffraction showed that both samples of the bulk catalyst precursors of the present invention were amorphous in character, and do not exhibit the long range order typically observed in XRD when large particles of crystallized phases are present. The X-ray diffraction pattern for Comparative Catalyst 1 showed crystallized $MoO_3$ and $CoMoO_4$, which are typically regarded as undesirable catalyst precursors for hydrotreating processes. It is believed that residual carbon inside the catalyst precursors of the present invention interrupts the crystallization of CoMo oxides so that CoMo oxide crystals either are not present or are present as small crystals that introduce little or no crystalline character into XRD spectra.

TABLE 2

| Catalyst | BET SA ($m^2/g$) | Carbon Content (wt. %) |
|---|---|---|
| Catalyst Precursor A CoMo-6-Gly | 15.6 | 23.8 |
| Catalyst Precursor B CoMo-4.8-Gly | <1 | 21.9 |
| Comparative Catalyst 1 CoMo Prepared Without Organic Acid | 20 | 0.22 |

It can be seen from Table 2 above that the bulk CoMo-6-Gly and CoMo-4.8-Gly catalyst precursors have relatively low surface areas. In particular, catalyst precursor CoMo-4.8 has a surface area less than 1 $m^2/g$. After heating, both catalyst precursors of this invention contain substantial amounts of carbon of about 22 to 24 wt. %. The carbon content of the catalyst precursors of this invention is a function of the heating conditions the catalysts experienced, i.e., the time and the temperature of the heating profile, as well as the ratios of glyoxylic acid/(Mo+Co) metal. The carbon content in the bulk CoMo catalyst precursors influences the morphology of the CoMo in such precursors and the resulting hydrodesulfurization catalytic activities of the sulfided catalysts.

EXAMPLE 1B

Additional Catalyst Precursor Synthesis Examples

1 M solutions of ammonium heptamolybdate tetrahydrate and cobalt acetate tetrahydrate were used to form additional catalyst precursors. A solution containing 5.7 wt % AHM, 4.0 wt % Co Acetate, and 17.3 wt % glyoxylic acid was formed by mixing appropriate amounts of the 1 M Mo and Co solutions with a solution containing 25 wt % of glyoxylic acid. The molar ratio of R/(Co+Mo) was 4.8. After heating, the solution yield to solid was about 8.6%.

Separately, a solution containing 12.8 wt % AHM, 9.1 wt % Co Acetate, and 39.1 wt % glyoxylic acid was formed by mixing appropriate amounts of the 1 M Mo and Co solutions with a solution containing 50 wt % of glyoxylic acid. The molar ratio of R/(Co+Mo) was 4.8. After heating, the solution yield to solid was about 19.4%.

EXAMPLE 1C

This example is directed to the synthesis of bulk trimetallic NiCoMo. A bulk trimetallic NiCoMo catalyst was prepared by a controlled heating process according to the invention. 200 mg NiO, 200 mg Co(OH)$_2$ and 1 g H$_2$MoO$_4$ were each dissolved/suspended in water in separate containers. A 50 wt. % glyoxylic acid solution was added to each container such that the concentration of acid in each container was 15 wt. %. The Ni, Co, and Mo solutions were combined and 6 ml 30% H$_2$O$_2$ added to the combined solution. The sample was heated at 250 C. for 4 hours to yield the bulk trimetallic NiCoMo catalyst precursor.

EXAMPLE 2

Catalyst Precursor Characterization

Figure 1:
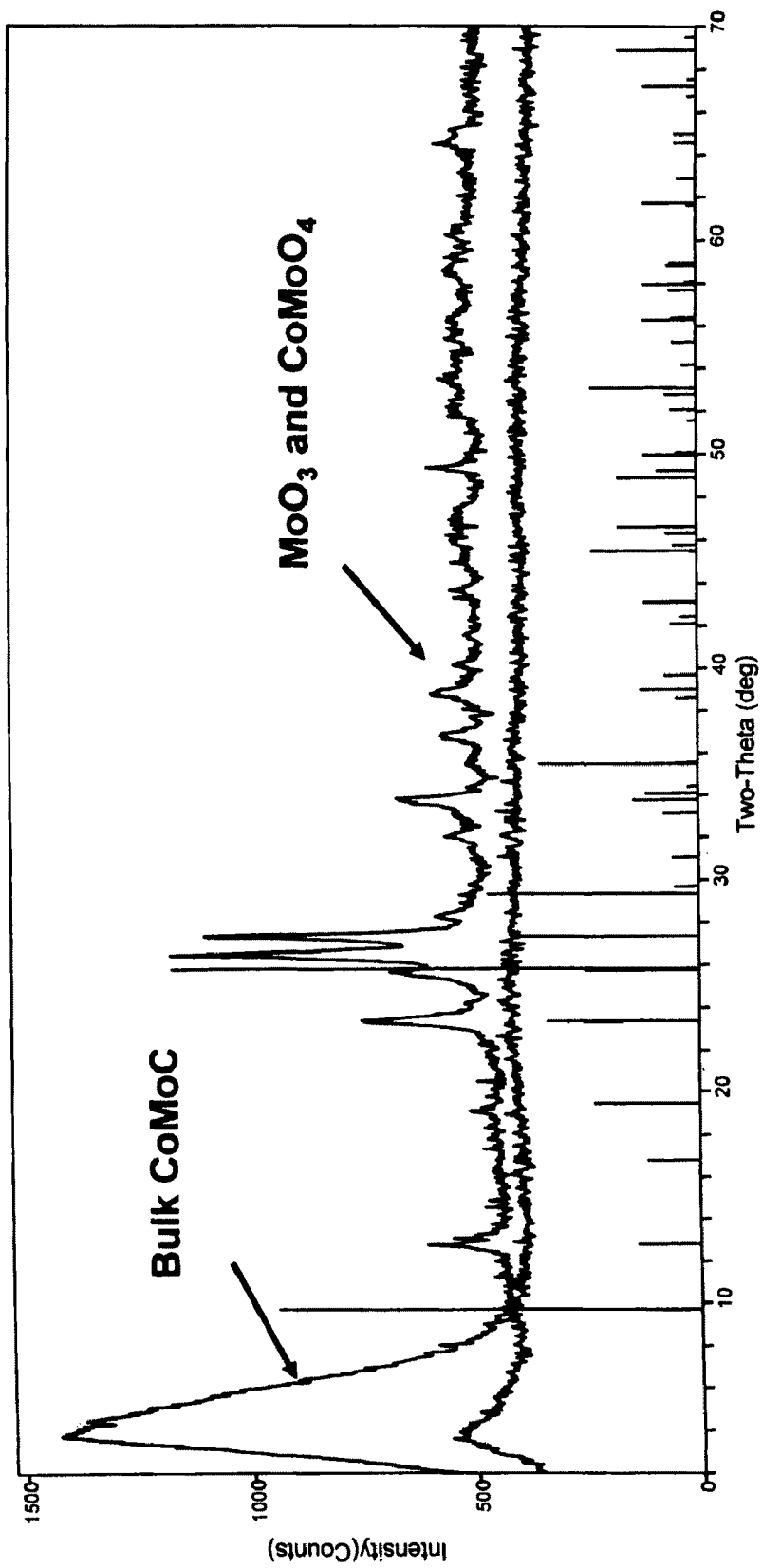
FIG. 1 provides X-ray Diffraction (XRD) patterns for a bulk CoMo catalyst precursor according to an embodiment of the invention and a comparative CoMo catalyst.

An X-ray Diffraction (XRD) analysis was performed on a CoMo based catalyst precursor synthesized according to an embodiment of the invention. The resulting XRD spectrum is shown in FIG. 1. As shown in FIG. 1, the CoMo based catalyst precursor has an amorphous XRD spectrum. It is believed that the organic compound-based component in the CoMo catalyst precursor interrupts the crystallization process, resulting in a CoMo catalyst precursor that does not have a detectable crystalline phase. In an alternative embodiment of the invention, a crystalline phase may be detectable in a catalyst precursor, but only as a portion of the catalyst precursor, resulting in XRD spectra with some crystalline character and some amorphous character. This is in contrast to the XRD spectrum of a bulk CoMo material (Comparative Catalyst 1) that was prepared without using an organic complexing agent, but that was otherwise prepared similarly to the catalyst precursors of the invention. The XRD spectrum for the bulk comparative CoMo material shows a crystalline morphology, including peaks that appear to represent MoO$_3$ and CoMoO$_4$.

EXAMPLE 3

Temperature Programmed Oxidation of Catalyst Precursor

Figure 2B:
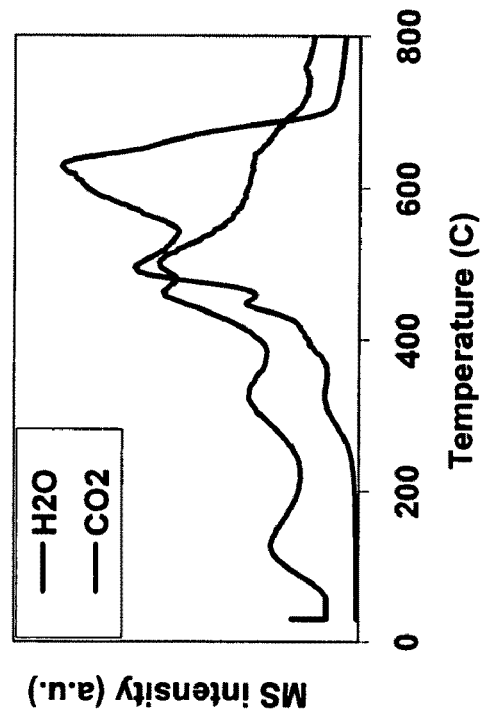
FIGS. 2a and 2b provide data related to a Temperature Programmed Oxidation (TPO) analysis of a catalyst precursor according to an embodiment of the invention.
Figure 2A:
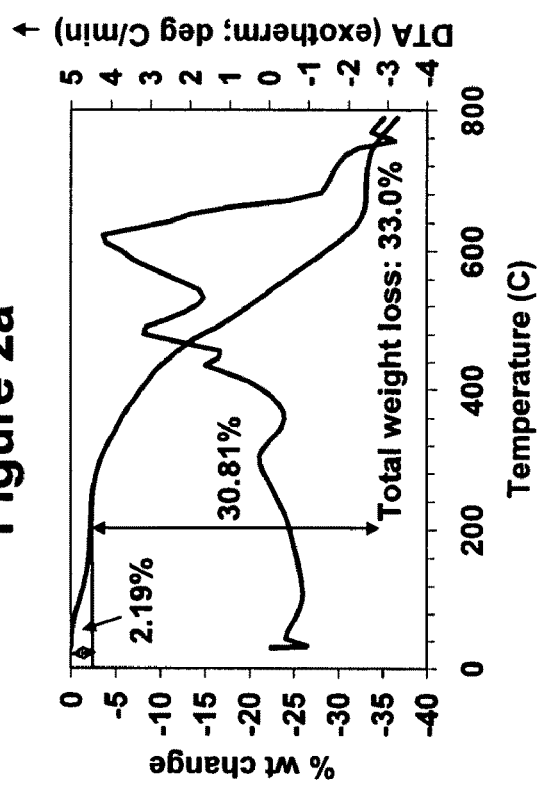

A temperature programmed oxidation (TPO) study was carried out to understand the nature of organic compound-based component of a catalyst precursor synthesized according to the procedure for Catalyst A in Example 1. FIG. 2a shows that the catalyst precursor loses about 30 wt % of weight as the catalyst precursor is exposed to increasing temperatures up to 650° C. FIG. 2b shows a mass spectrometry characterization of the products generated from the catalyst precursor sample as a function of temperature. The primary products generated during the TPO study were CO$_2$ and H$_2$O. Based on FIGS. 2a and 2b, it is believed that at 650° C. all of the carbon has been removed from the catalyst precursor sample. The TPO study, in combination with the Temperature Programmed Reduction study described in Example 4, indicates that the organic compound-based component is composed of at least carbon, hydrogen, and oxygen.

EXAMPLE 4

Temperature Programmed Reduction of Catalyst Precursor

FIG. 3 shows the results from a Temperature Programmed Reduction analysis (H$_2$-TPR) of a catalyst precursor synthesized according to the procedure for Catalyst Precursor A in Example 1. The H$_2$-TPR analysis was carried out in a 5% H$_2$/He atmosphere, with a temperature change rate of 10° C. per minute. The results of the H$_2$-TPR study are shown in FIGS. 3a and 3b. FIG. 3a shows the total weight loss as measured by thermo-gravimetric analysis. By the time the sample reached 700° C., almost 40% of the weight of the precursor sample was removed. As shown in FIG. 3b, this weight loss was in the form of H$_2$O, CO$_2$, and CO released from the precursor sample. The species released from the sample are believed to represent removal of the organic compound-based component and/or conversion of some metal oxides into lower oxidation states.

Note also that FIGS. 2a, 2b, 3a, and 3b indicate that removal of the organic compound-based component is minimal until a temperature near 400° C. is achieved. Based on this, it is preferred that sulfidation of catalyst precursors, which also occurs in a reducing environment, should take place at a temperature of less than about 400° C., preferably less than about 350° C. For example, one preferred sulfidation temperature is about 325° C.

EXAMPLE 5

Catalyst Characterization

A bulk catalyst precursor of this invention similar to Catalyst Precursor A was subjected to bulk sulfidation. A highly active material was obtained. FIG. 4 shows X-ray Diffraction Pattern for the catalyst precursor as prepared, the corresponding catalyst after sulfidation, and a comparative spectrum of bulk MoS$_2$ made directly from AHM and H$_2$S. FIG. 4 shows that the sulfided material is substantially amorphous and/or includes only small particles relative to the resolution of XRD, as compared to the distinctive diffraction peaks of the bulk MoS$_2$. This is consistent with TEM micrographs of the sulfided catalyst, which showed small crystal sizes. It is believed that these small crystals represent metal sulfides, possibly also including metal carbosulfides. In an alternative embodiment, at least a portion of a sulfided catalyst according to the invention can have crystalline character that is detectable by XRD. In such an embodiment, the resulting XRD spectra may have some crystalline character and some amorphous character.

EXAMPLE 6

Sulfidation of Catalyst Precursors

Figure 5:
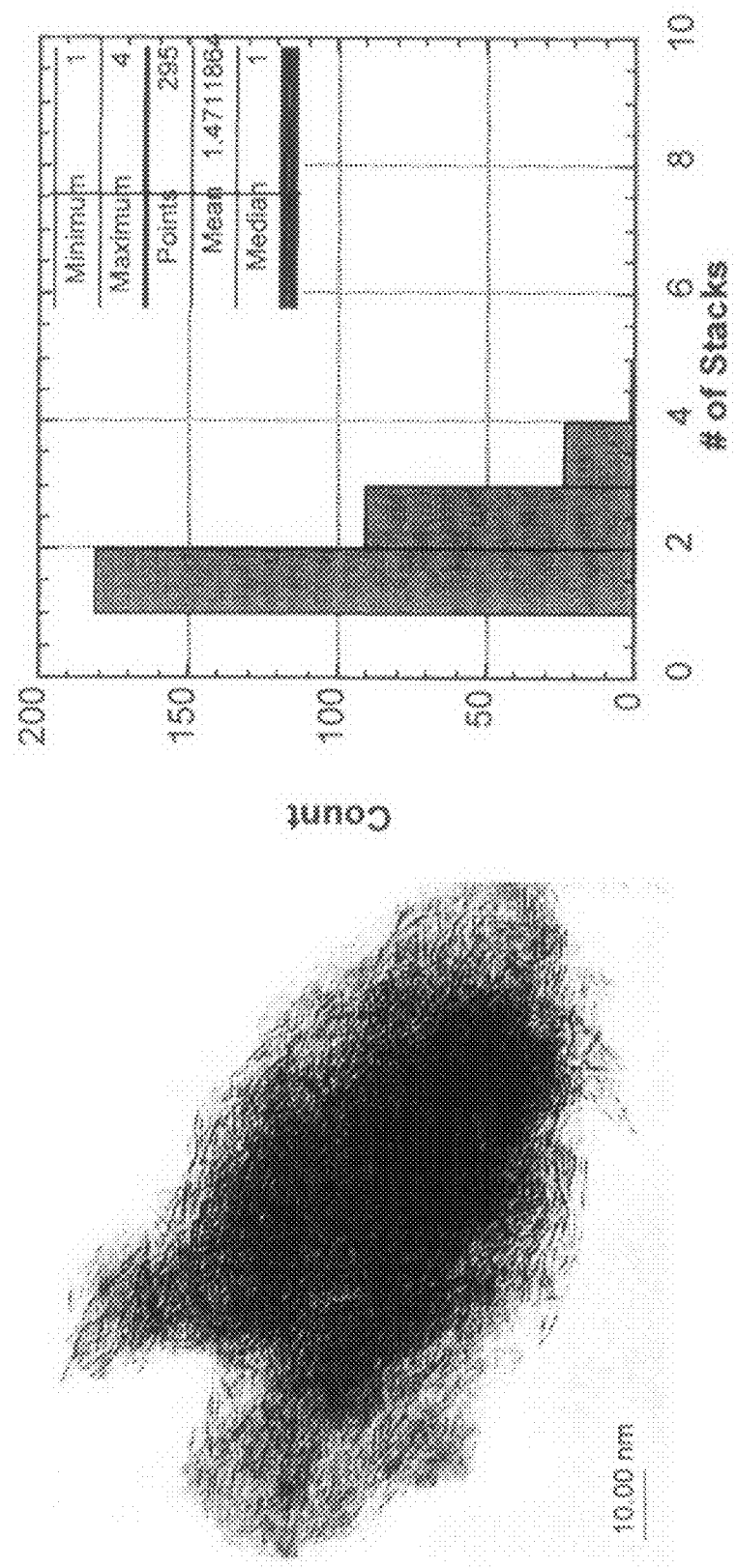
FIG. 5 provides a TEM of a sulfided catalyst according to an embodiment of the invention.

The procedure of Example 1 was followed to generate a catalyst precursor similar to Catalyst Precursor A. This catalyst precursor was then sulfided by a liquid phase sulfidation procedure according to an embodiment of the invention. FIG. 5 provides a TEM micrograph and stack height analysis for the resulting sulfided catalyst. The TEM data shows an average stack height for MoS$_2$ stacks in the sulfided catalyst of about 1.5.

Figure 6A:
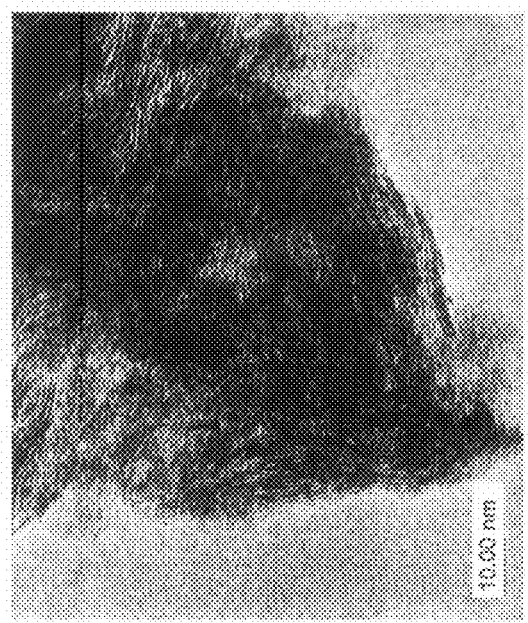
FIGS. 6a and 6b provide TEM images of sulfided catalysts according to embodiments of the invention.
Figure 6A:
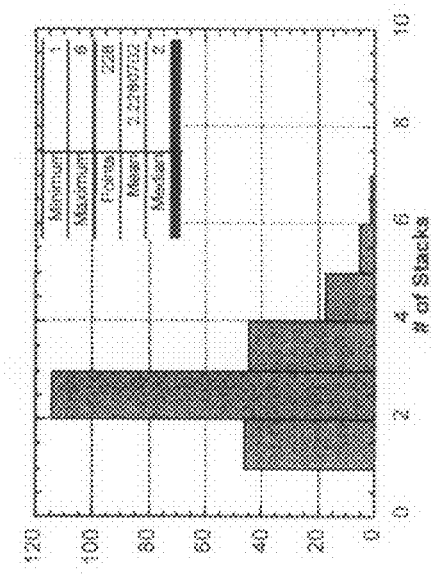
Figure 6B:
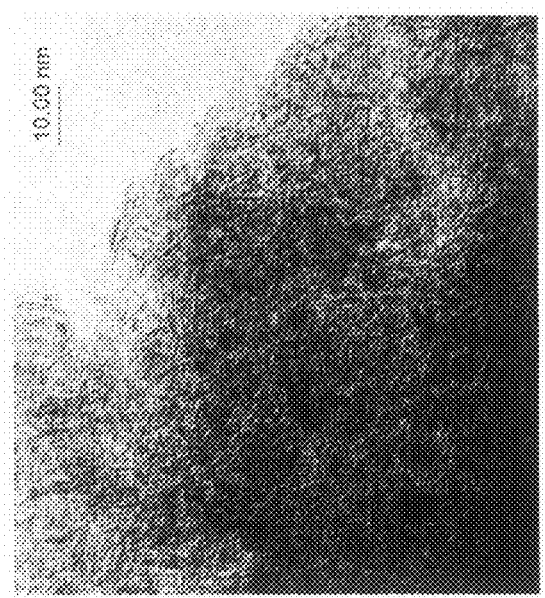
Figure 6B:
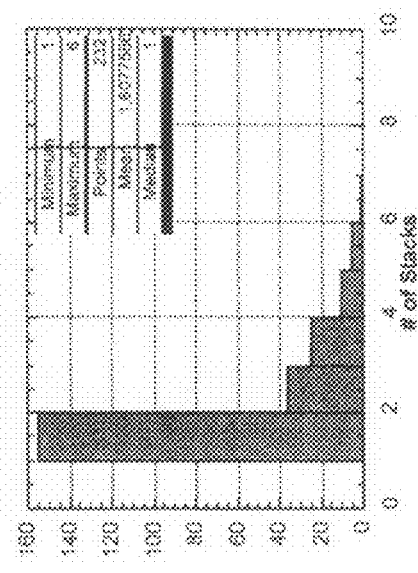

FIGS. 6a and 6b depict TEM data for two additional types of sulfided catalysts. The catalysts corresponding to FIGS. 6a and 6b were prepared using gas phase sulfidation processes to sulfide catalyst precursors prepared in a manner similar to Catalyst Precursor A. The catalyst corresponding to FIG. 6a was prepared by sulfiding a catalyst precursor in 10% H$_2$S/H$_2$ at 232° C. for 18 hours, followed by sulfiding at 321° C. for an additional 12 hours. The catalyst corresponding to FIG. 6b was sulfided in 10% H$_2$S/H$_2$ at 600° C. for 4 hours.

The TEM data for the gas phase sulfided catalysts show an average measured stack height of 1.6 for the catalyst in FIG. 6a and 2.2 for the catalyst in FIG. 6b. Additionally, the gas phase sulfided catalysts shown in FIGS. 6a and 6b appear to be less homogenous than the sample shown in FIG. 5. This effect is more noticeable for the catalyst in FIG. 6b, which was sulfided at a higher temperature.

EXAMPLE 7

Temperature Programmed Oxidation of Sulfided Catalyst

Figure 7:
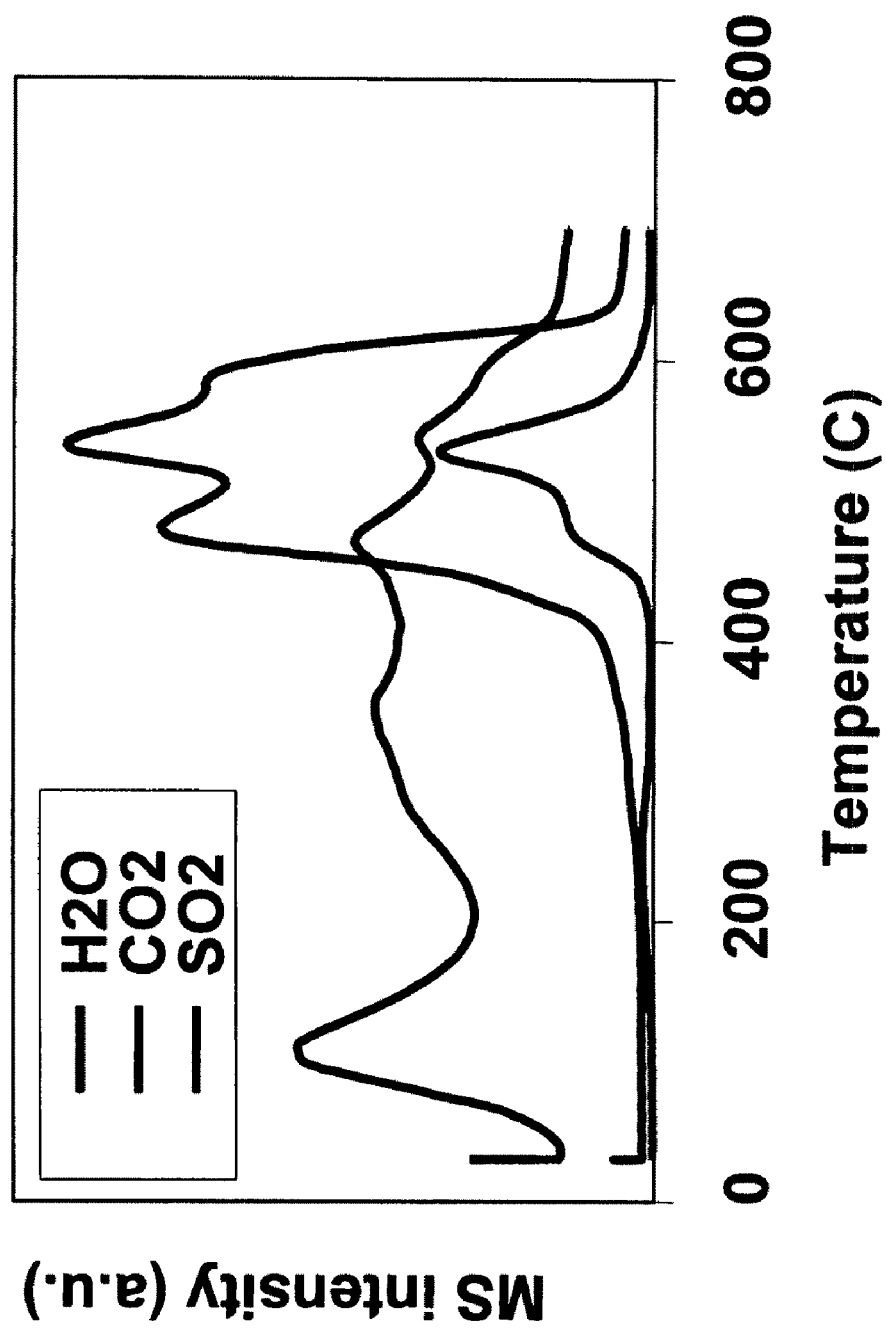
FIG. 7 provides data related to a TPO study of a sulfided catalyst according to an embodiment of the invention.

FIG. 7 depicts results from a TPO study of a sulfided catalyst prepared according to an embodiment of the invention. The sulfided catalyst was prepared by liquid phase sulfidation of a catalyst precursor similar to Catalyst Precursor A. Note that the $CO_2$ and $SO_2$ peaks are both in the temperature range of 400-600° C. Without being bound by any particular theory, in this temperature range it is believed that the bulk $CoMoS_2$ converts exothermically to Co oxide and Mo oxide with evolution of $SO_2$. The evolution of $CO_2$ in the same temperature window as $SO_2$ is consistent with the formation of a carbosulfide phase (such as $CoMoS_xC_y$) where the carbon is structurally part of the sulfide phase. Note also that $H_2O$ is released at high temperature and may be associated either with remaining portions of the organic compound-based component or surface SH groups.

EXAMPLE 8

Heating Step Variations

Catalyst precursors were prepared similar to Catalyst Precursor A except that different heating steps were performed on four different samples in four different atmospheres—air, nitrogen, hybrid (mixture of air and nitrogen), and without air-flow (statically heated). In the hybrid atmosphere heating, the furnace was ramped in a nitrogen atmosphere from about room temperature to about 325° C. in one hour and held at 325° C. under nitrogen for 2 additional hours, then the atmosphere was gradually switched to air in a period of about 2 hours. The final treatment was carried out in air at 325° C. for two hours. The surface area and carbon content was measured for each sample and the results are presented in Table 3 below.

TABLE 3

Surface Areas and C-Contents of Bulk CoMo Catalyst Precursors

| CoMo-Glyoxylic Acid Catalysts | BET SA ($m^2$/g) | C Content (wt %) |
|---|---|---|
| Air heating at 617° F. | 9.7 | 22.0 |
| Hybrid heating at 617° F. | <0.5 | 22.8 |
| $N_2$ heating at 617° F. | 0.7 | 22.7 |
| Statically heating at 617° F. | 0.8 | 22.0 |

It can be seen from Table 3 above that the bulk CoMo catalyst precursors have relatively low surface areas. Except for the bulk CoMo catalyst precursor heated in air, which has less than 10 $m^2$/g surface area, the other catalyst precursors have surface area less than 1 $m^2$/g. After heating in air, and/or nitrogen, and/or hybrid (a mixture of air and $N_2$), and/or without air-flow (static atmosphere), all catalyst precursors contain substantial amounts of carbon, about 22 to 23 wt %.

EXAMPLE 9

Hydrodesulfurization and Hydrodenitrogenation

Figure 8:
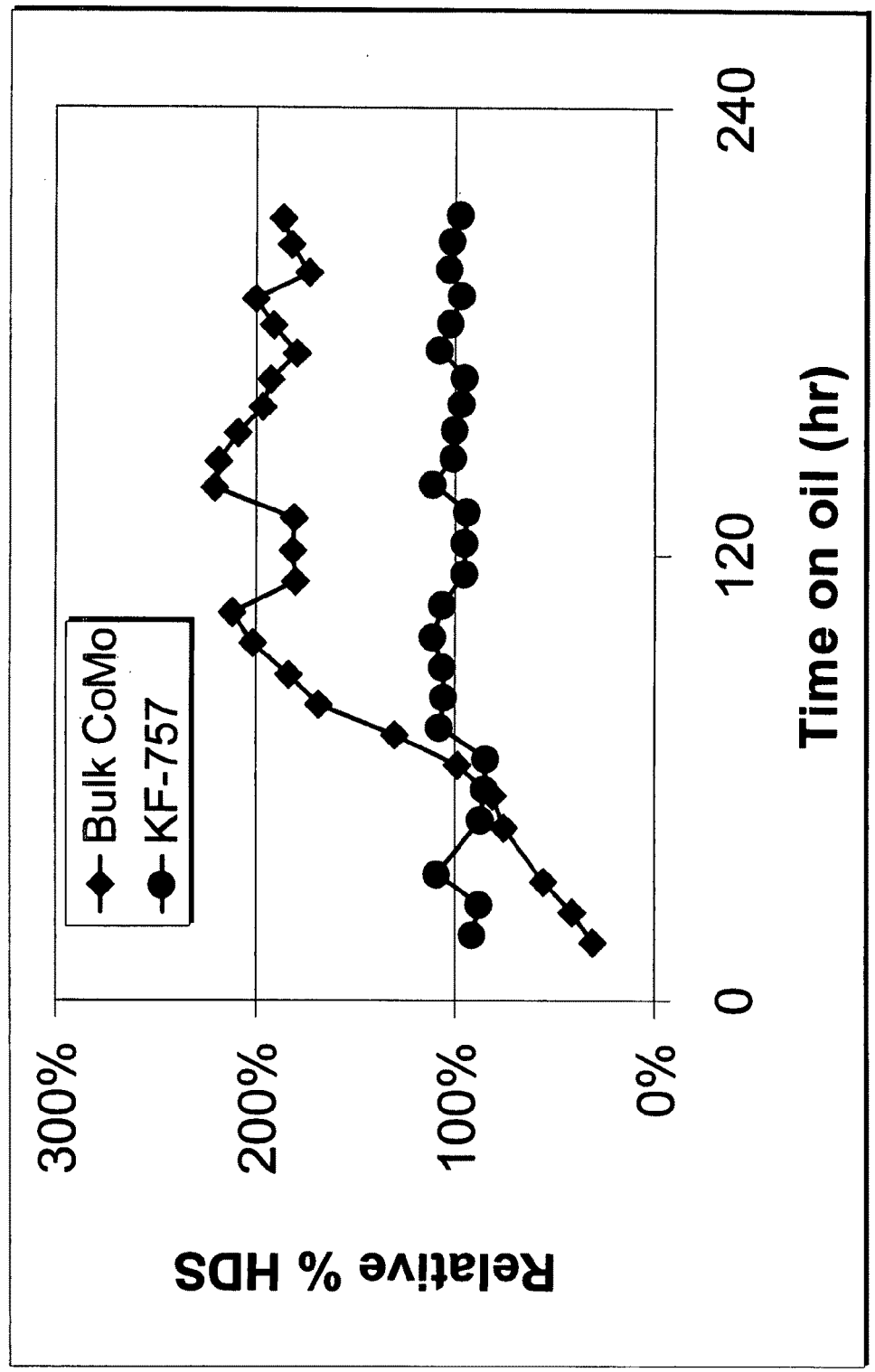
FIG. 8 depicts hydrodesulfurization activity data for various catalysts.

FIG. 8 shows the relative hydrodesulfurization activity of a CoMo catalyst prepared according to an embodiment of the invention and a commercially available catalyst. The commercially available catalyst is a Ketjenfine® 757 (KF-757™) catalyst available from Albemarle Catalysts Company LP of Houston, Tex. The KF-757™ catalyst is composed of Co and Mo on an alumina support. The inventive CoMo catalyst was prepared by sulfiding a catalyst precursor prepared by a method similar to the method for Catalyst Precursor A. However, the catalyst precursor used for this example was heated at 325° C. in the presence of nitrogen, rather than air. The hydrodesulfurization process corresponding to the data in FIG. 8 was performed at a pressure of 220 psig. As shown in FIG. 8, the relative activity of the inventive bulk metallic catalyst is roughly twice the activity of the KF-757™ catalyst.

Figure 9:
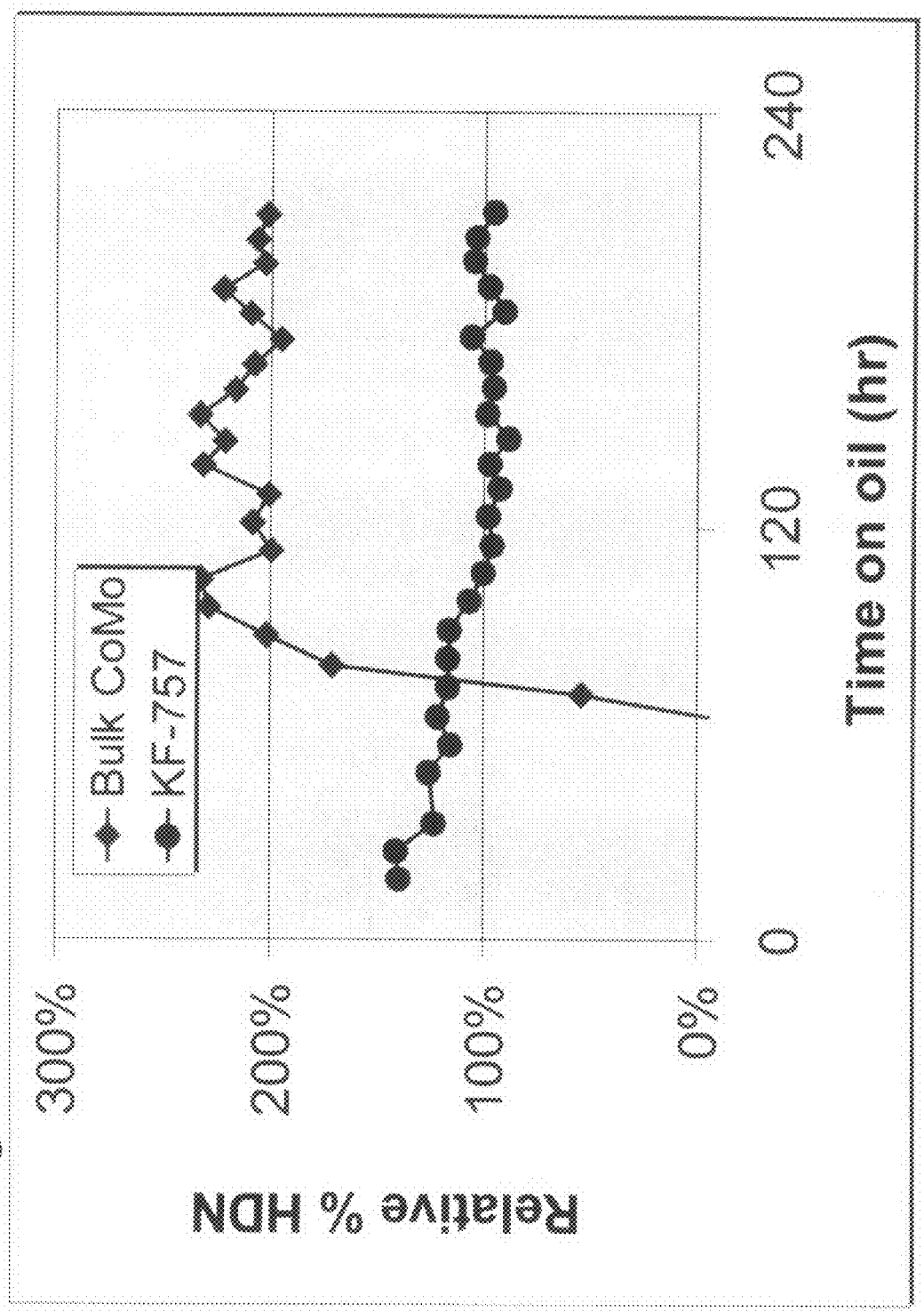
FIG. 9 depicts hydrodenitrogenation activity data for various catalysts.

FIG. 9 shows a similar comparison of the inventive catalyst and KF-757™ for hydrodenitrogenation activity. The catalyst according to the invention also shows twice the activity for hydrodenitrogenation as compared to KF-757™. The process corresponding to FIG. 9 was also performed at 220 psig.

Figure 10:
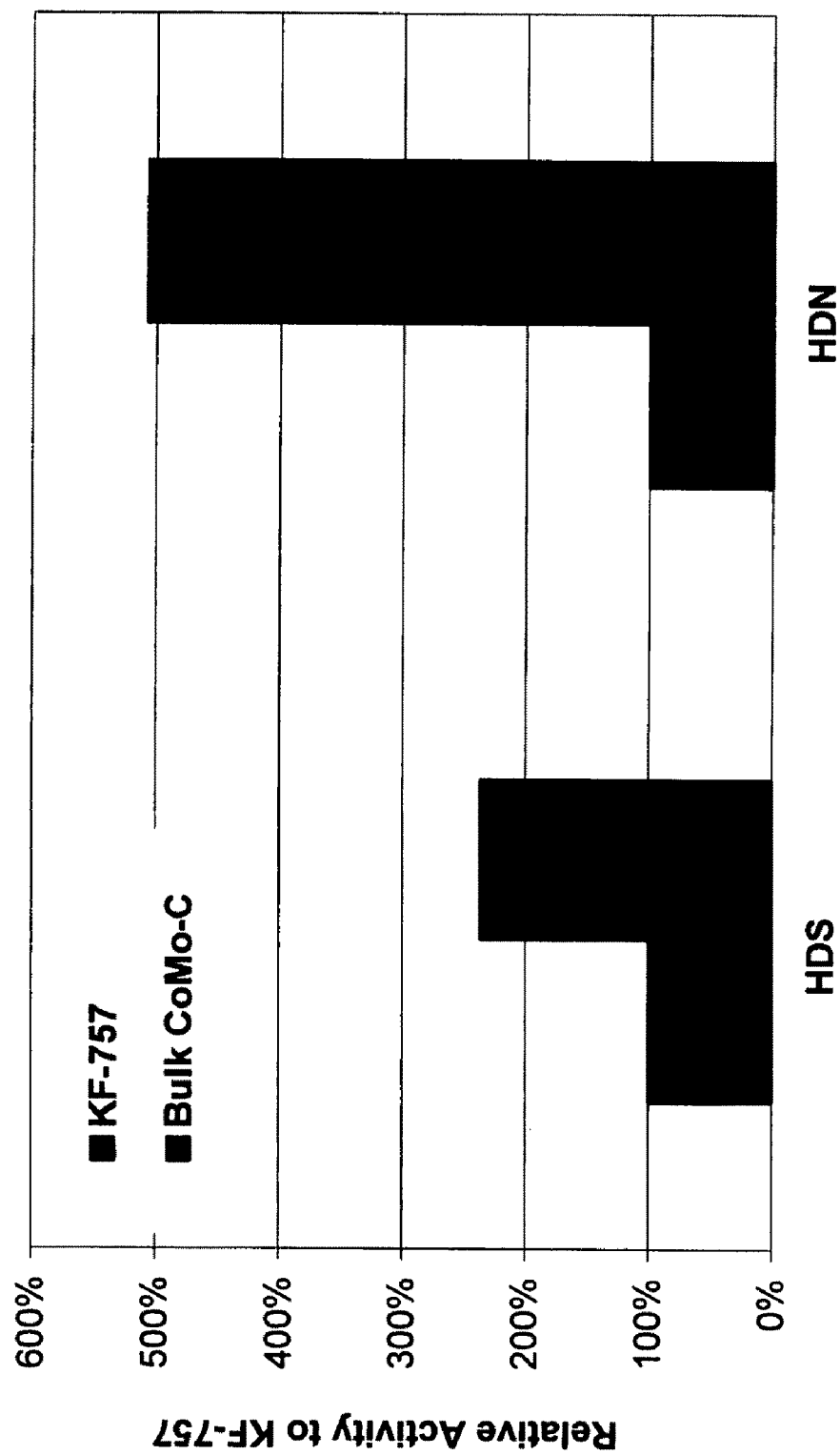
FIG. 10 depicts hydrodesulfurization and hydrodenitrogenation activity data for various catalysts.

FIG. 10 shows a comparison of both hydrodesulfurization and hydrodenitrogenation activity for an inventive catalyst and KF-757™ for a hydrotreatment process performed at 500 psig. As shown in FIG. 10, at this higher pressure the catalyst according to an embodiment of the invention shows a similar activity credit for hydrodesulfurization at 500 psig as compared to KF-757™, and also shows 5 times the activity for hydrodenitrogenation at 500 psig.

In a further example, the relative activity at low $H_2$ pressure was determined for a catalyst according to the invention (corresponding to Catalyst A in Example 1) versus KF-757™. A hydrotreated feedstock was treated in a three phase reactor at 329° C., 200 psig $H_2$, and 700 SCF/B of $H_2$. The properties of the initial hydrotreated feedstock and treated feedstocks are provided in Table 4 below.

TABLE 4

| | Feed | KF-757 ™ | Bulk CoMo-C |
|---|---|---|---|
| S, ppm | 4500 | 55 | 16 |
| N, ppm | 39 | 17 | 7 |
| API | 37.9 | 38.1 | 38.2 |
| Arom % | 25.7 | 24.8 | 25.2 |

As shown in Table 4, the catalyst according to the invention exhibits higher HDS and HDN activity while reducing the amount of aromatic saturation. Again, the reduced aromatic saturation is a beneficial trait from the standpoint of reducing overall hydrogen consumption during hydrotreating.

The same types of catalysts were also compared for hydrotreatment at medium pressure. A virgin feedstock with a T95 value of 773° F. (412° C.) was treated in a three phase reactor at 329° C., 500 psig $H_2$, and 700 SCF/B $H_2$. Additional details regarding the initial feedstock and the treated feedstocks are provided in Table 5 below.

TABLE 5

| | Feed | KF-757 ™ | Bulk CoMo-C |
|---|---|---|---|
| S, ppm | 18600 | 1420 | 190 |
| N, ppm | 167 | 60 | <2 |
| API | 32.2 | 35.4 | 36.4 |

TABLE 5-continued

|  | Feed | KF-757 ™ | Bulk CoMo-C |
|---|---|---|---|
| Aromatics, wt % | 32.8 | 26.7 | 24.0 |
| 1 ring | 15.4 | 21.4 | 20.2 |
| 2 ring | 7.7 | 3.5 | 3.0 |
| 3+ ring | 8.7 | 1.8 | 0.8 |

As shown in Table 5, the catalyst according to the invention showed higher HDS and HDN activity than the commercial catalyst, with only a modest increase in hydrogen consumption.

EXAMPLE 10

Characterization of Activity Relative to Organic Content

Figure 11:
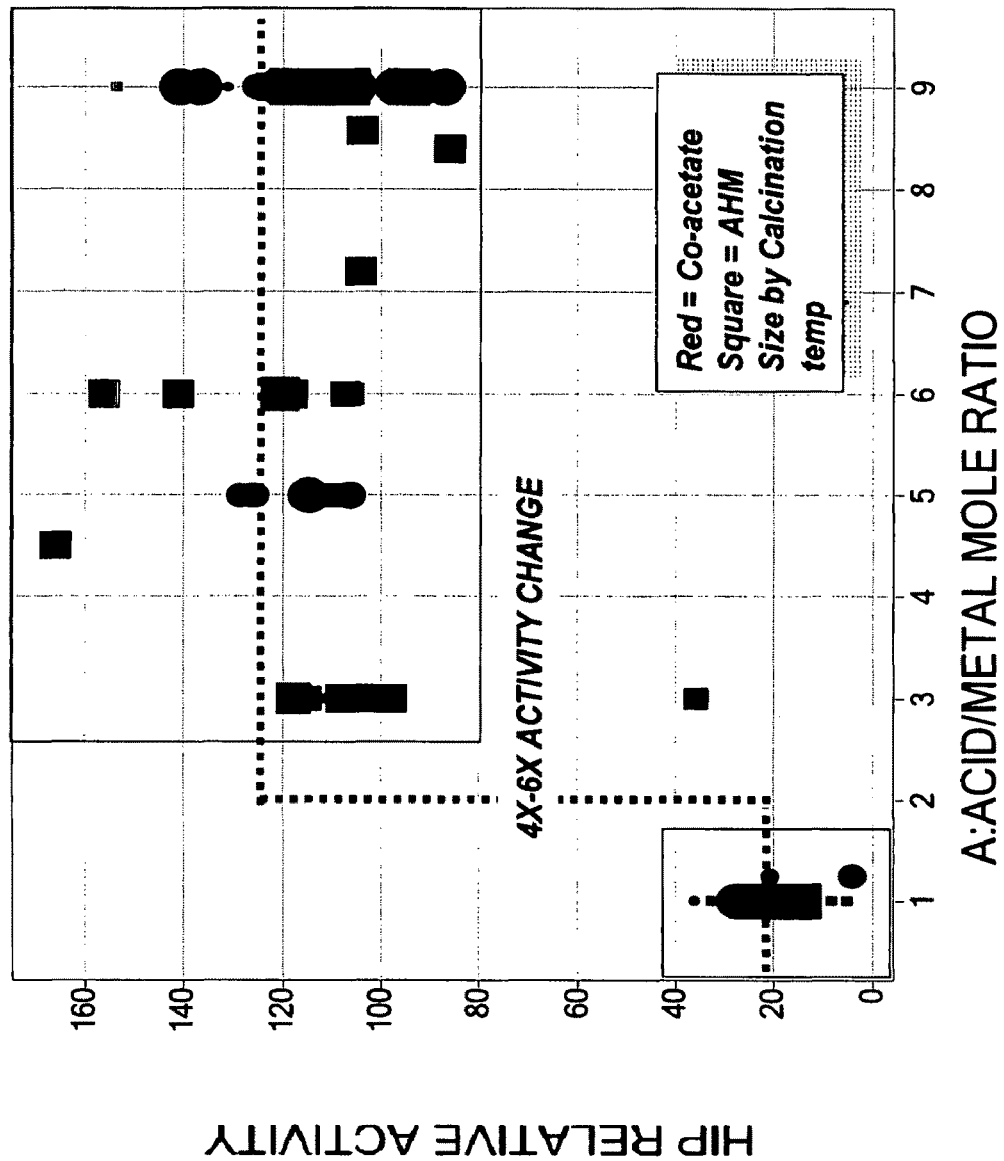
FIG. 11 depicts catalyst activity as a function of the amount of organic complexing agent used to form a catalyst precursor.

FIG. 11 shows the relative activity of bulk CoMo catalysts created using varying amounts of organic complexing agent. The data in FIG. 11 was generated by creating various catalyst precursors using glyoxylic acid as the organic complexing agent. As shown in FIG. 11, catalyst precursors having a ratio of organic complexing agent to metal of less than about 2:1 result in catalysts with a substantially lower activity. Catalysts with a organic complexing agent to metal ratio of greater than about 2:1, and preferably greater than about 3:1, exhibit a relative activity that is 4 to 6 times greater than the activity of the catalysts with a ratio below about 2:1.

EXAMPLE 11

Variations in Precursor Composition Based on Heating Profile

Figure 12:
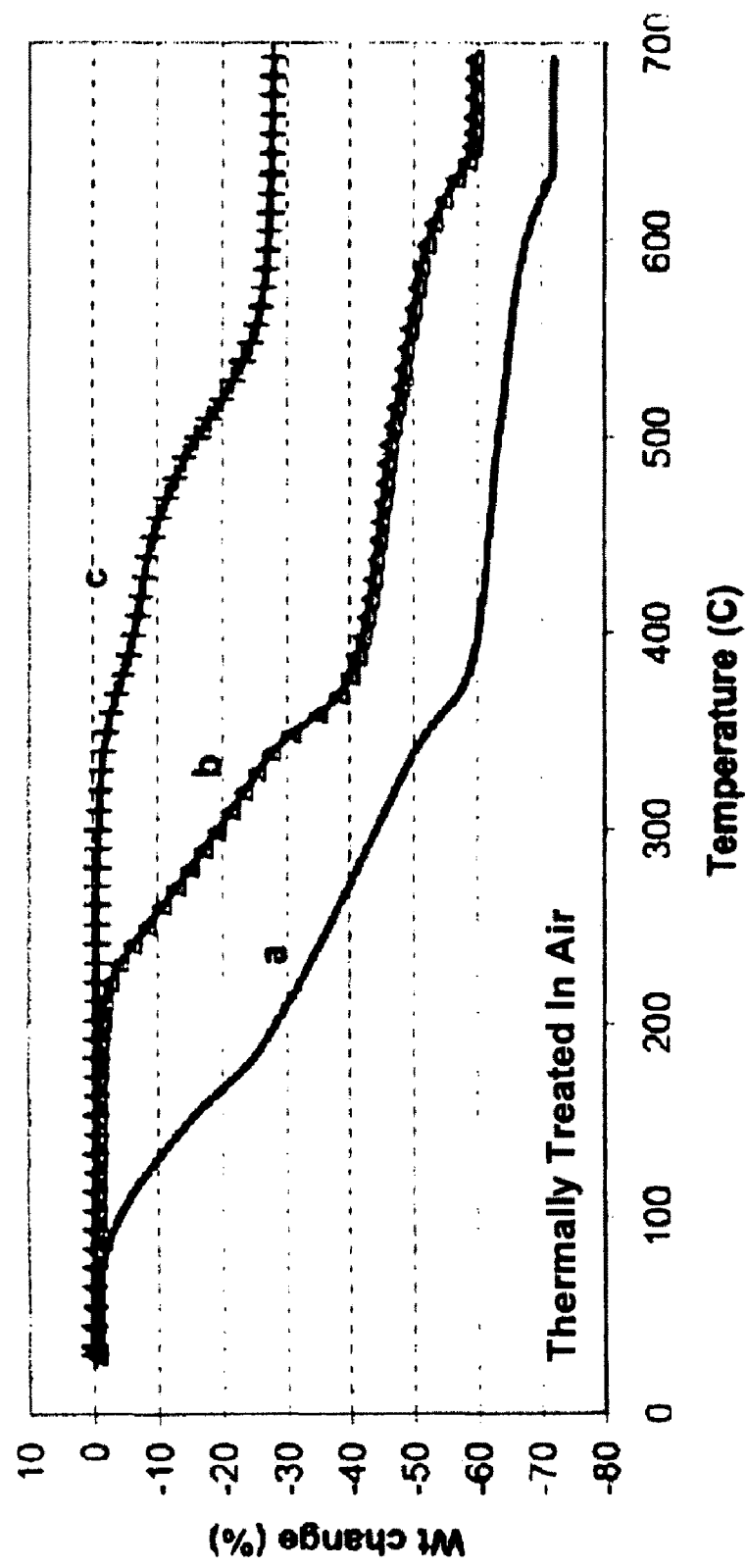
FIGS. 12-16 provide results from additional TPO studies of bulk catalyst precursors.
Figure 13:
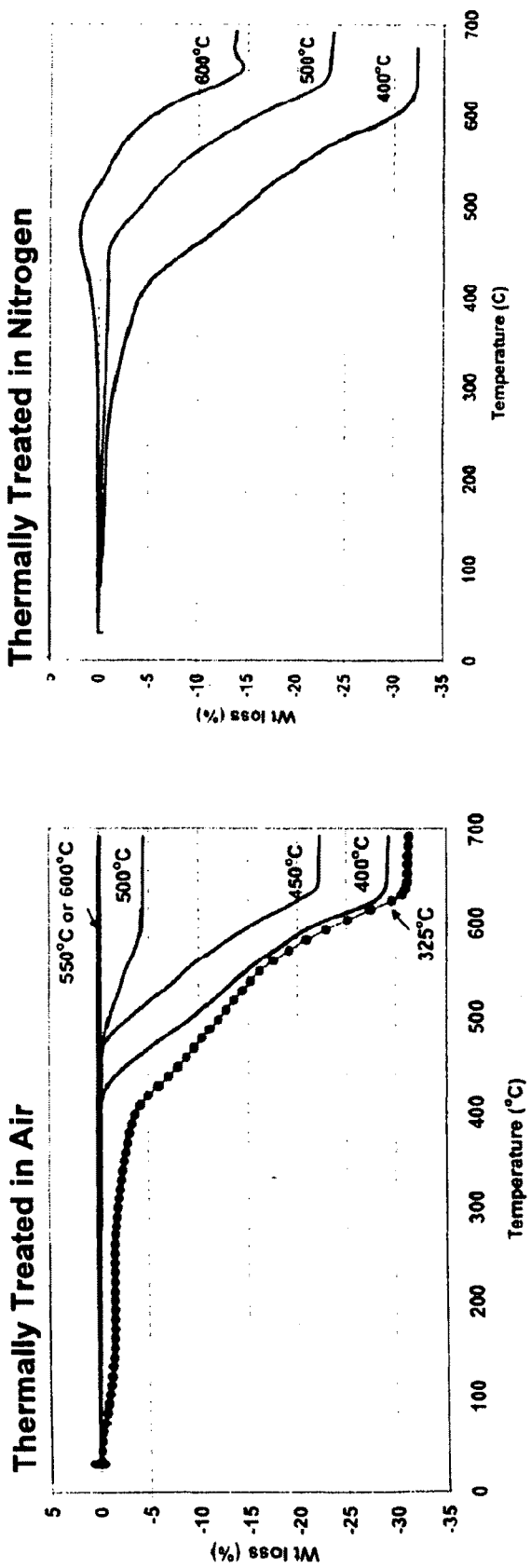

FIGS. 12 and 13 depict a TPO study of bulk CoMo precursors prepared using glyoxylic acid and exposed to different heating profiles. In FIG. 12, sample a) was heated at 80° C. for 14.5 hours in an air flow. Sample b) was heated at 250° C. for 4 hours in air flow. Sample c) was heated in air at 325° C. for 4 hours. In FIG. 13, sample d) was heated at 400° C. for 4 hours in $N_2$. Sample e) was heated at 500° C. for 4 hours in $N_2$. Sample f) was heated at 600° C. for 4 hours in $N_2$.

FIGS. 12 and 13 show the decreasing amount of material that can be removed during a TPO study for catalyst precursors exposed to increasing temperatures in the heating profile. As can be seen the CoMo catalyst precursor material heated to 80° C. shows a weight loss of around 70 wt % (FIG. 12, a). The catalyst precursor sample heated at 250° C. in air or in $N_2$ (not shown) for 4 hours had a weight loss of around 60% (FIG. 12, b). Samples exposed to a still higher temperature of 325° C. prior to the TPO study showed a weight loss of around 30-40 wt % (FIG. 12, c). Further temperature increases from about 400 to about 600° C., as shown in FIG. 13, lead to further loss of the organic material. As also shown in FIG. 13, heating of a catalyst precursor in the presence of air to a temperature of 550° C. or greater prior to TPO resulted in catalyst precursors that did not lose weight during the TPO study, indicating that full removal of organic material had occurred during the heating to 550° C. in air. However, under a similar heating profile, catalysts exposed to a nitrogen atmosphere did show some weight loss during a TPO study. Even for a catalyst heated in a nitrogen atmosphere at 600° C., FIG. 13 indicates that the organic material was not fully removed. This indicates that heating under a nitrogen (or other inert) atmosphere can provide better control of the organic material decomposition. More generally, based on the TPO studies, it appears that the amount of organic compound-based component in a catalyst precursor can be controlled by controlling the heating conditions applied to the catalyst precursor.

Figure 14:
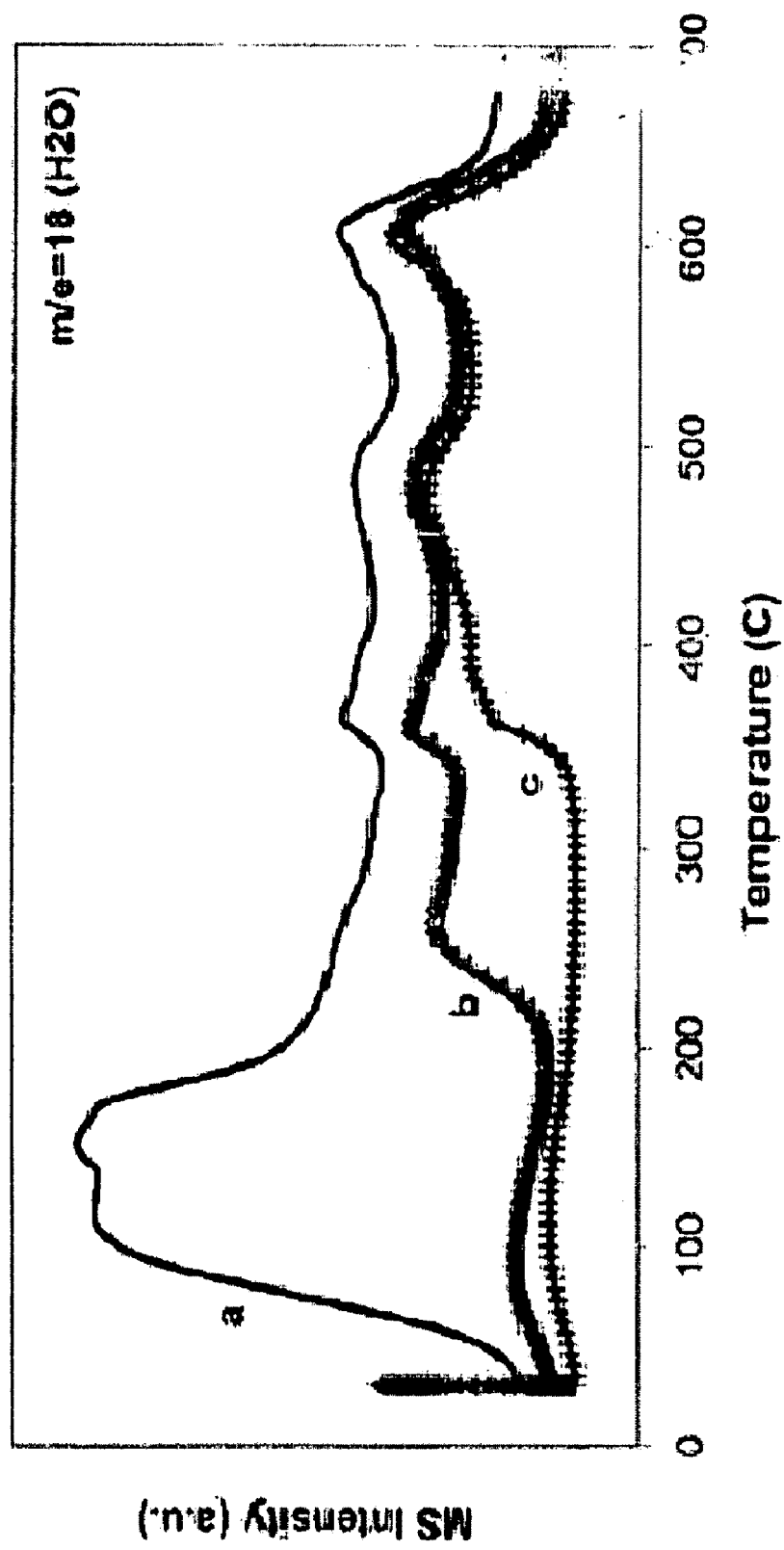
Figure 15:
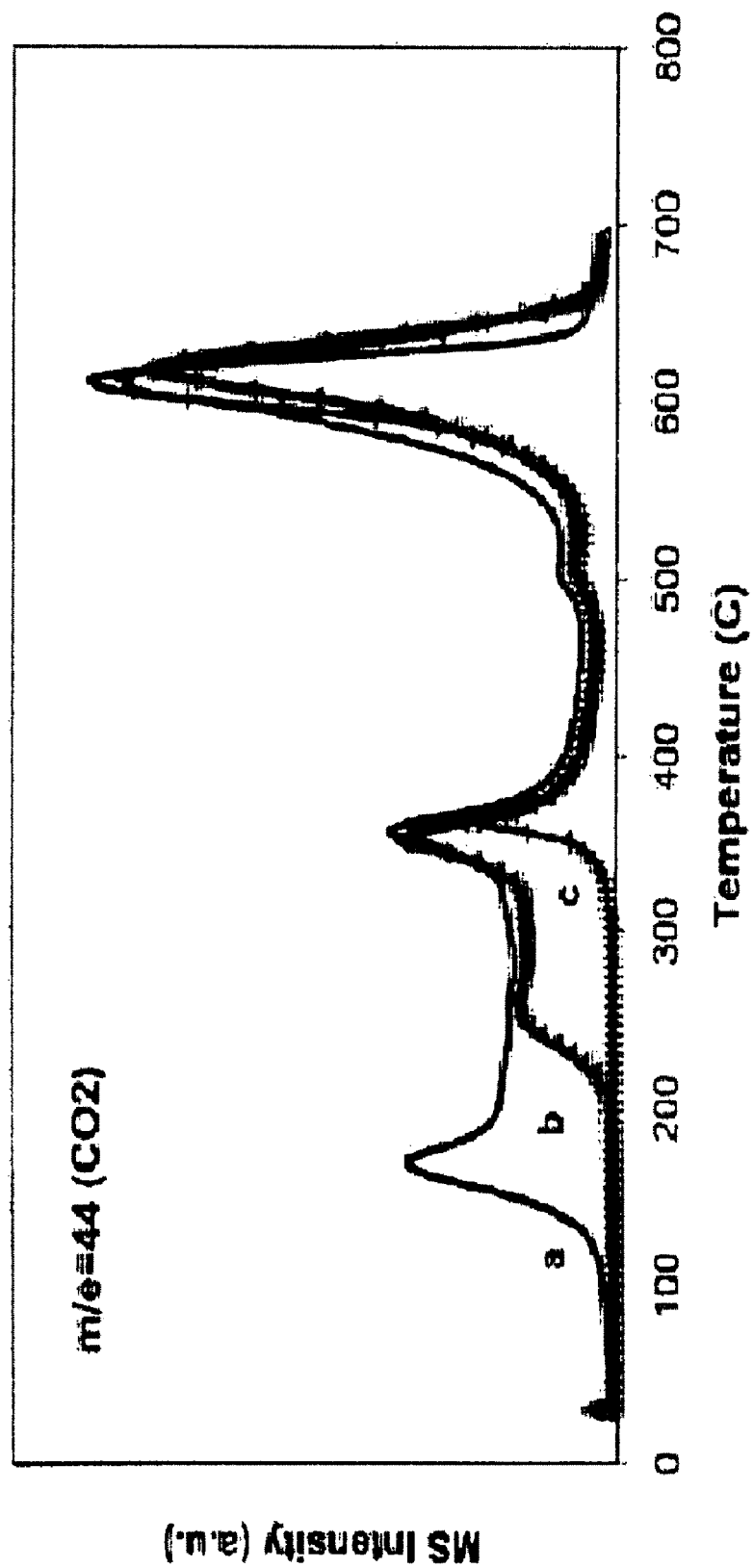

The products evolved from the sample were also characterized using mass spectrometry for the TPO studies similar to those shown in FIGS. 12 and 13. FIG. 14 depicts the evolution of the $H_2O$ signal during TPO of bulk CoMo catalyst precursor treated under conditions similar to studies a)-c), but with an $N_2$ atmosphere instead of an air atmosphere. FIG. 15 depicts the evolution of $CO_2$ for the same samples.

FIGS. 14 and 15 show that the precursor prepared similar to sample a) released a noticeable amount of water and $CO_2$ below 200° C. Without being bound by any particular theory, it is believed that the release of $H_2O$ and $CO_2$ can be attributed to adsorbed water molecules adsorbed and excess glyoxylic acid present in the precursor after the 80° C. heat treatment. After thermal treatment in $N_2$ at 250° C., the evolution of $H_2O$ and $CO_2$ is missing, as would be expected. Above 250° C., the release of $H_2O$ and $CO_2$ observed was similar to the evolution of $H_2O$ and $CO_2$ for the sample having the 80° C. heat treatment. The sample heated in $N_2$ to 325° C. also followed this pattern, with minimal or no release below 325° C., and releases similar to the other samples for the remainder of the temperature range. In particular, a large portion of the $CO_2$ released by all of the samples was at a temperature near 600° C. Without being bound by any particular theory, it is believed that this evolution of $CO_2$ near 600° C. (and the corresponding peak in the $H_2O$ spectrum) indicates that a portion of the glyoxylic acid or a resulting glyoxylic acid-based component had a strong interaction or binding with the metal sites. Similar results were observed for samples thermally treated in air.

Based on the above TPO studies, in some embodiments it may be preferable to expose the catalyst precursor to a temperature above about 200° C.-250° C. Such a heat treatment appears to remove an initial burst of water and organic material from the catalyst precursor, which could be beneficial for later processing or use. In alternative embodiments, TPO studies can be performed on catalyst precursors prepared with other organic complexing agents to identify temperature differences in the evolution temperature for the initial amount of water and organic material. In another embodiment, the catalyst precursor should be maintained at a temperature below about 450° C. to avoid the decomposition of the strongly interacting glyoxylic acid or its components. Those of skill in the art will recognize that this temperature may also vary, depending on the nature of the organic complexing agent selected.

Figure 16:
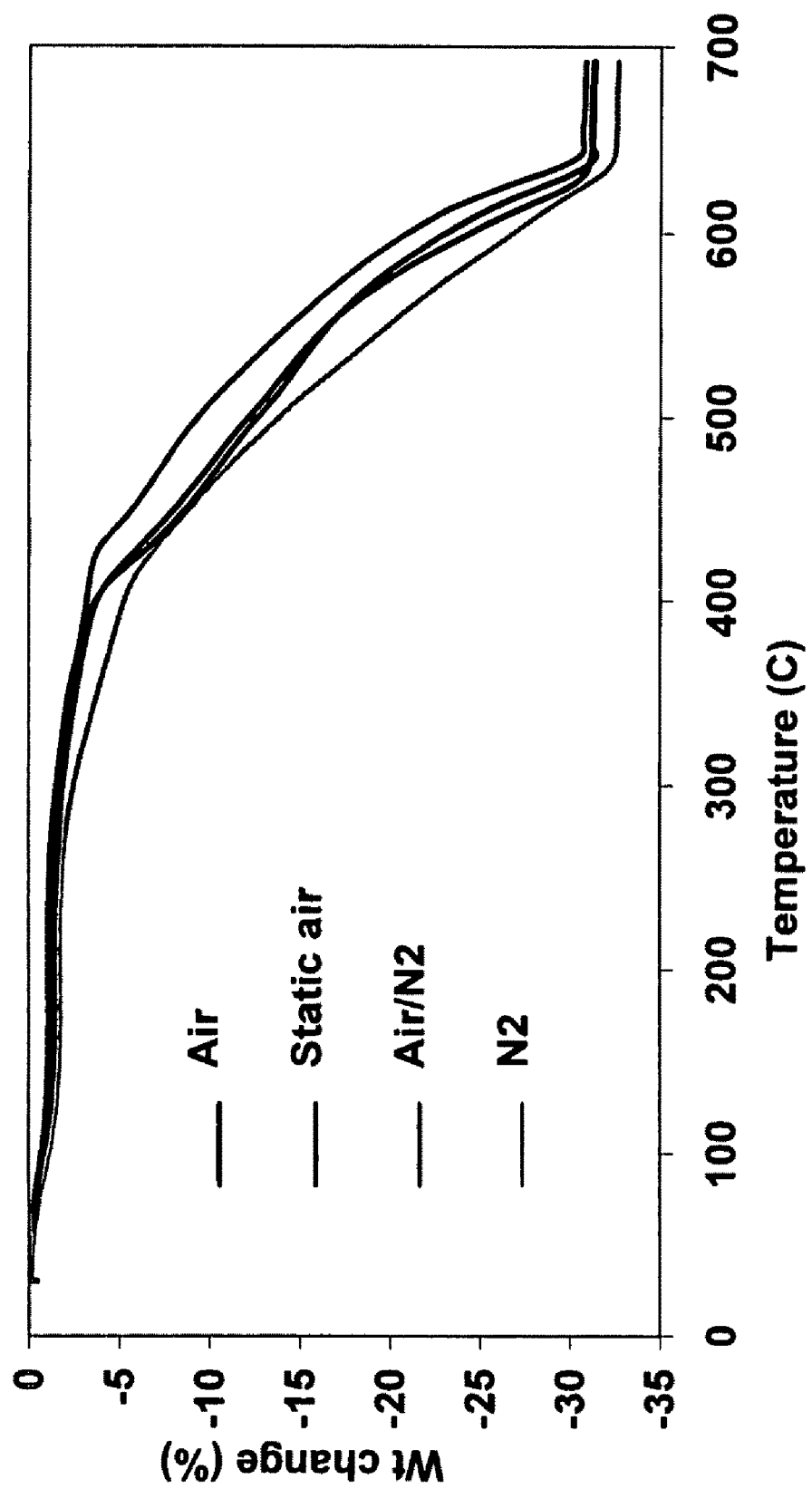

FIG. 16 depicts yet another TPO of bulk CoMo catalyst precursor prepared using glyoxylic acid after thermal treatment at 325° C. in different atmospheres: Air flow, Static air, Nitrogen/Air and nitrogen flow. FIG. 16 shows that the weight loss (during TPO) of bulk CoMo catalyst precursors obtained under different atmospheres is not strongly influenced by the atmosphere under which thermal treatment takes place. Similar weight loss was observed for all four catalyst precursors, which were obtained at the same thermal treatment temperature (325° C.). At temperatures above 325° C., the weight loss can be influenced by the atmosphere present during heating of the catalyst precursor.

In general, the TPO results (FIGS. 12-16) are consistent with carbon analysis and BET surface area measurement as shown in Table 2 above.

EXAMPLE 12

Additional Catalyst Precursor Characterization

Figure 17:
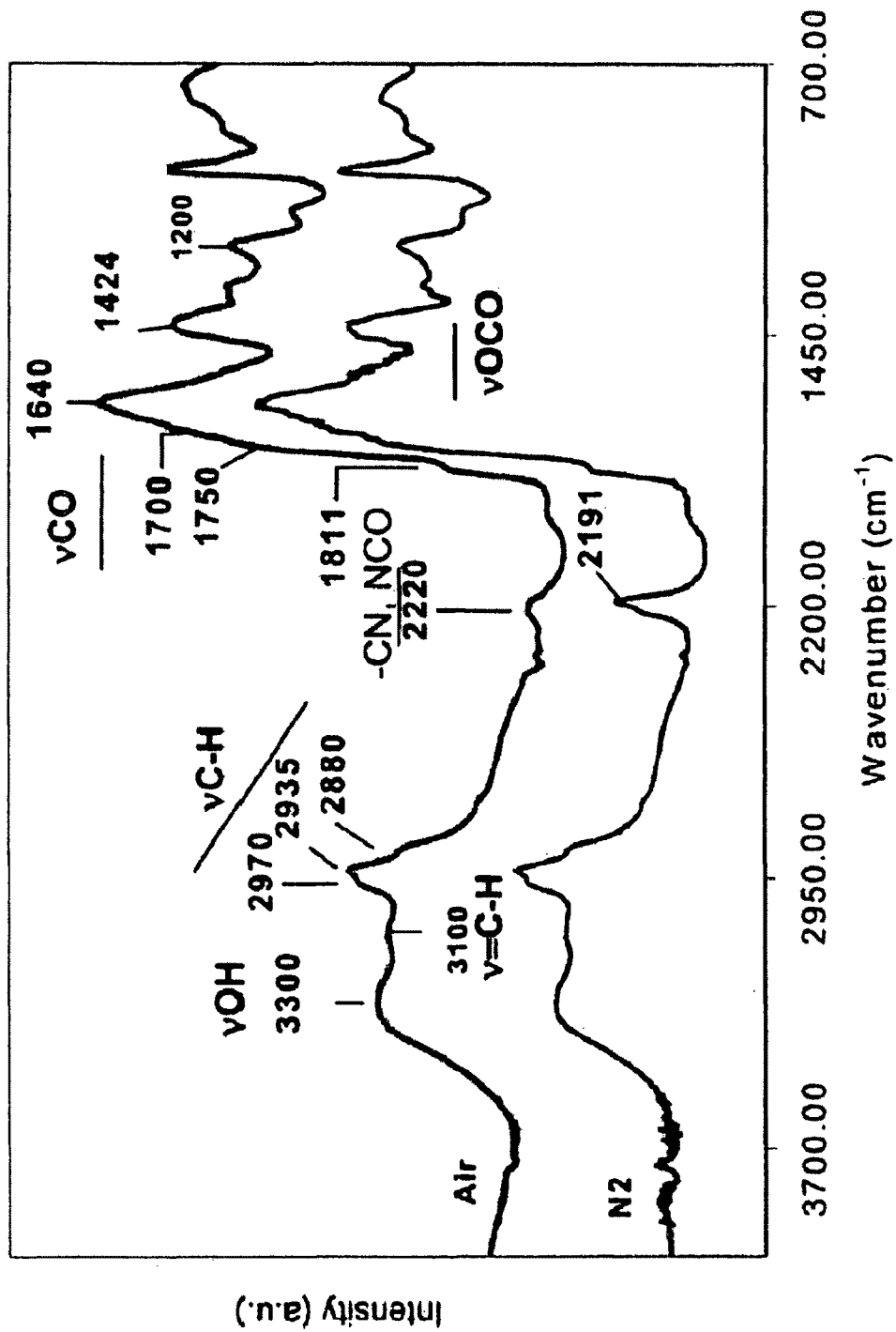
FIGS. 17 and 18 depict Diffuse Reflectance Fourier Transform Infrared Spectroscopy results of studies on catalyst precursors heated according to various heating profiles.

FIG. 17 depicts DRIFTS spectra of bulk CoMoC material thermally treated at 325° C. in air and $N_2$. Diffuse Reflectance Infrared Fourier Transform Spectroscopy (DRIFTS) spectra were collected on a Nicolet 670 FTIR spectrometer equipped with a liquid $N_2$-cooled MCT detector. The spectra were recorded with a resolution of 8 $cm^{-1}$. A powder sample of bulk CoMo was loaded into a controlled atmosphere DRIFTS cell (Thermo Spectra Tech) fitted with ZnSe windows. The cell was connected to a gas system able to feed in dry He and other gases. A programmed furnace was used to control the sample temperature. Typically the as prepared sample was treated in He at 120° C. at 2° C./min and held for 1 hour to dry the sample.

As shown by FTIR, the organic compound-based materials present in the catalyst precursors are similar. The C=O vibration characteristic of aldehyde and acid groups are observed in the range of 1700 to 1900 $cm^{-1}$, while the OCO vibration characteristic of carboxyl groups can be seen in the range of 1400 to 1650 $cm^{-1}$. The shift in the C=O vibration can be attributed to the complexation of the metal sites (e.g. Co or/and Mo moieties) with organic complexing agent (e.g. glyoxylic acid) functional groups (aldehyde and carboxylic). Other species such as aliphatic $CH_2$ in 1970-2880 $cm^{-1}$) and nitrile/isocyanate (2220-2191 $cm^{-1}$) are evidenced. There is also evidence of aromatic-type moiety =CH (3100 $cm^{-1}$) and species with an —OH type group at 3300 $cm^{-1}$. It is believed that the various surface species are associated with the organic acid (or complexing agent) forming complexes with the metal sites. Chemical transformation to produce new surface species during thermal activation may also occur. For example, the presence of nitrile/isocyanate can be explained by $NH_3$ reaction with glyoxylic acid. $NH_3$ can be formed during the decomposition of ammonium cations present in the molybdenum precursor.

Figure 18:
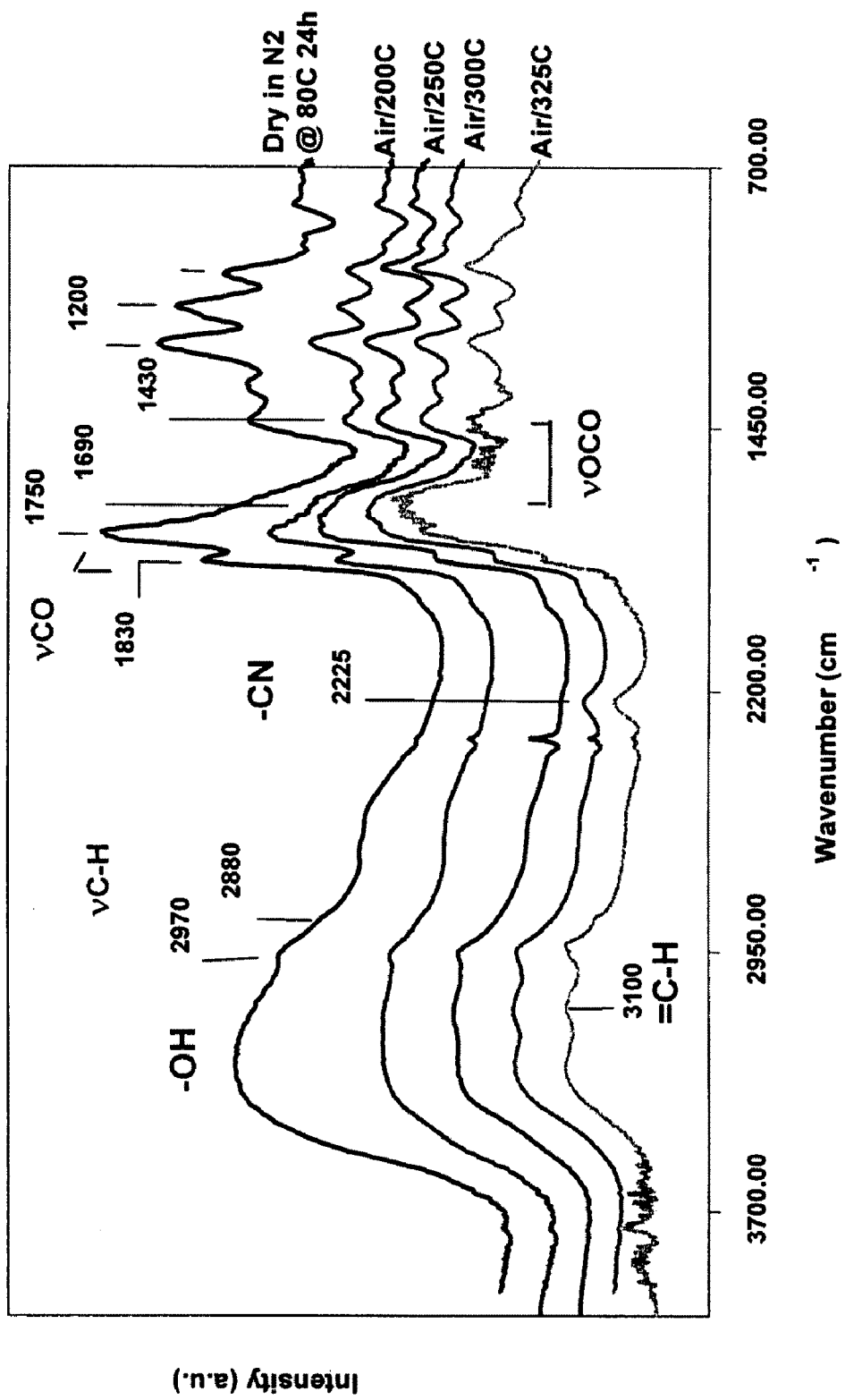

FIG. 18 provides a comparison of DRIFTS spectra of bulk CoMo materials from different stages of thermal treatment. As shown in FIG. 17, the key features observed for the catalyst precursors appear to be present through entire heating process up to 325° C. This indicates the complexes formed between organic acid and metals prior to the heating step are stable or mostly maintained when the sample is thermally treated at 325° C., though there is release of $H_2O$ and $CO_2$ as shown in FIG. 14 and FIG. 15.

Figure 19:
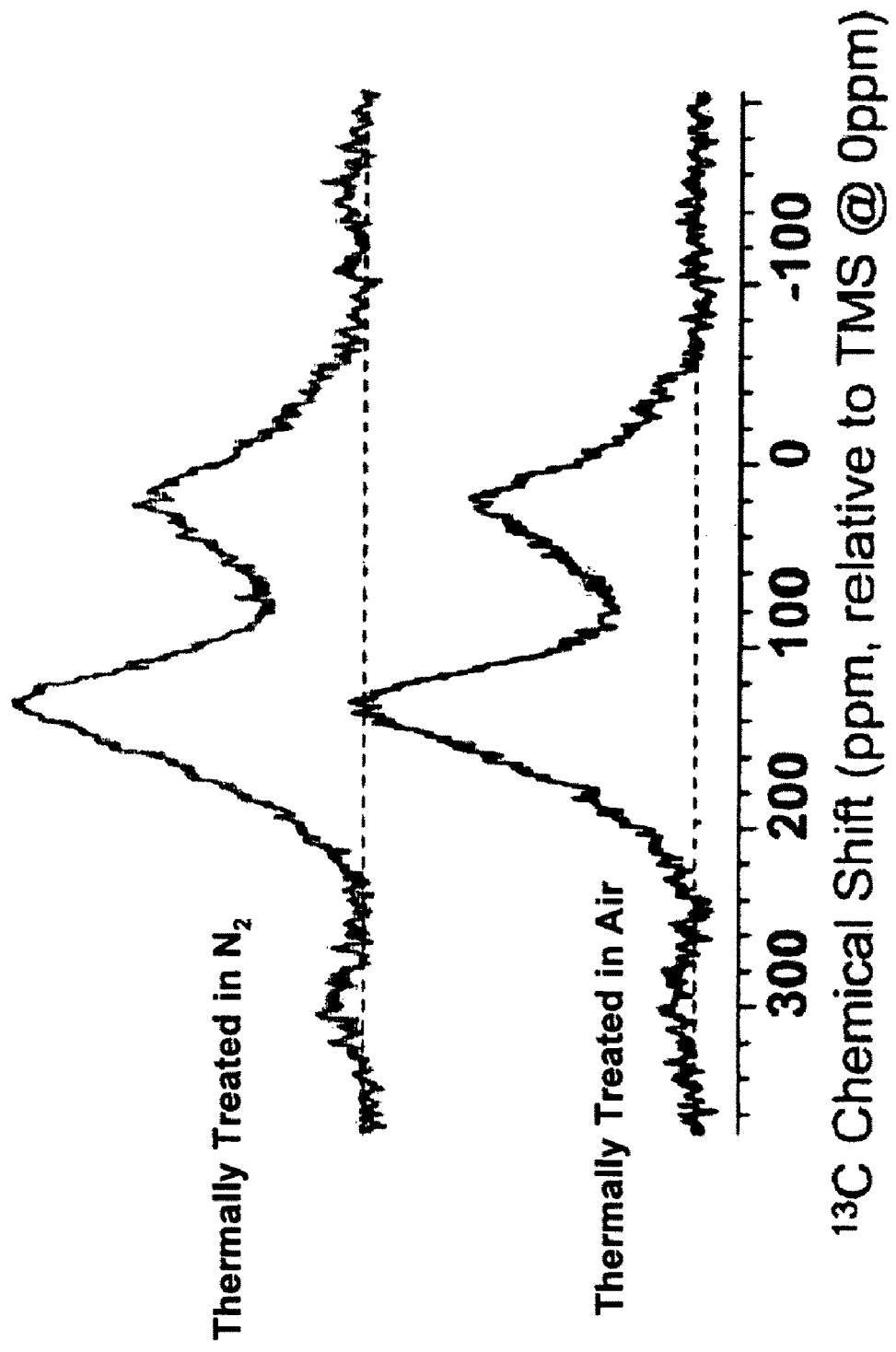
FIG. 19 depicts $^{13}C$ NMR spectra for catalyst precursors heated in different atmospheres.

FIG. 19 depicts $^{13}C$ NMR spectra of bulk CoMo catalyst precursor thermally treated at 325° C. under air and $N_2$. The $^{13}C$ NMR data shown in FIG. 19 provides further evidence of the complexation of organic complexing agent, e.g. glyoxylic acid to metals. The $^{13}C$ NMR spectra were recorded under conditions of magic angle spinning (MAS) to avoid the chemical shift anisotropy and some dipole interactions. Aliphatic $CH_2$-type carbon appears in the Chemical Shift range 0-40 ppm. C—N— type carbon can also be observed in the range of 15 to 60 ppm. The C=O of aldehyde groups is observed in 190-220 ppm while C+O of carboxylic groups is observed in the range of 170-180 ppm. Aromatic carbon is normally observed in the range of 120-160 ppm. In addition, carbons in C—O and C—N groups generally are observed at around 40-80 ppm. These results are in line with FTIR data and can be explained by the complexation of metal with glyoxylic acid functional groups.

Figure 20:
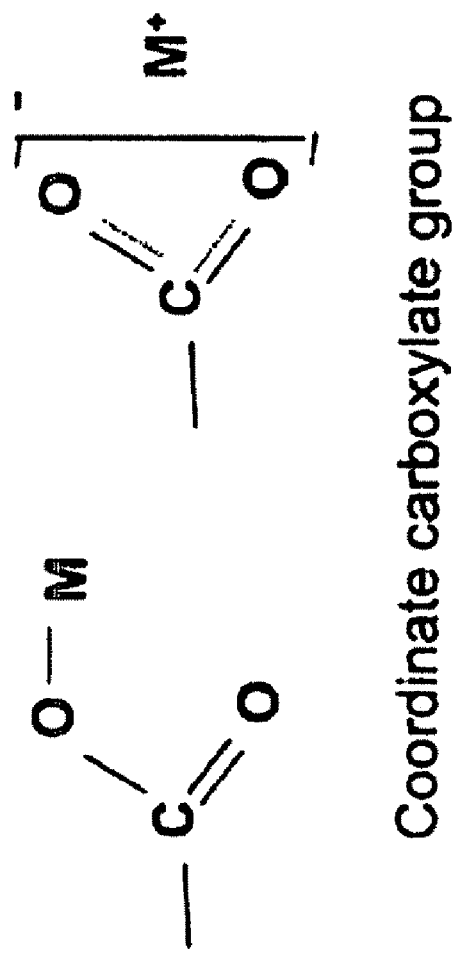
FIG. 20 depicts possible complex configurations for metals in catalyst precursors according to the invention.
Figure 20:
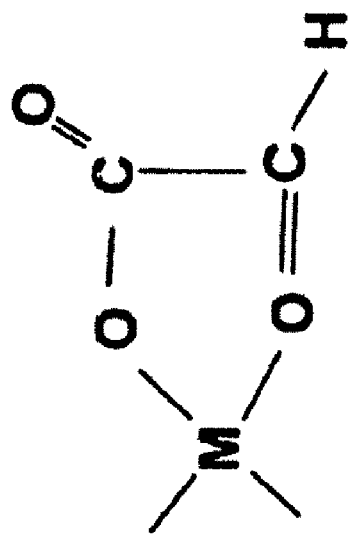

FIG. 20 depicts possible configurations of how metals may complex with glyoxylic acid or another carboxylic acid. Organic complexing agents of this invention, e.g. glyoxylic acid, may bind metals in mono-dentate, bi-dentate, or bridged fashions. The structure of complexes may vary depending the nature of organic complexing agent and acidity (pH) of solution if the complexation is allowed to form in aqueous solution. FIG. 20 provides limited examples of such complex formation.

Figure 21:
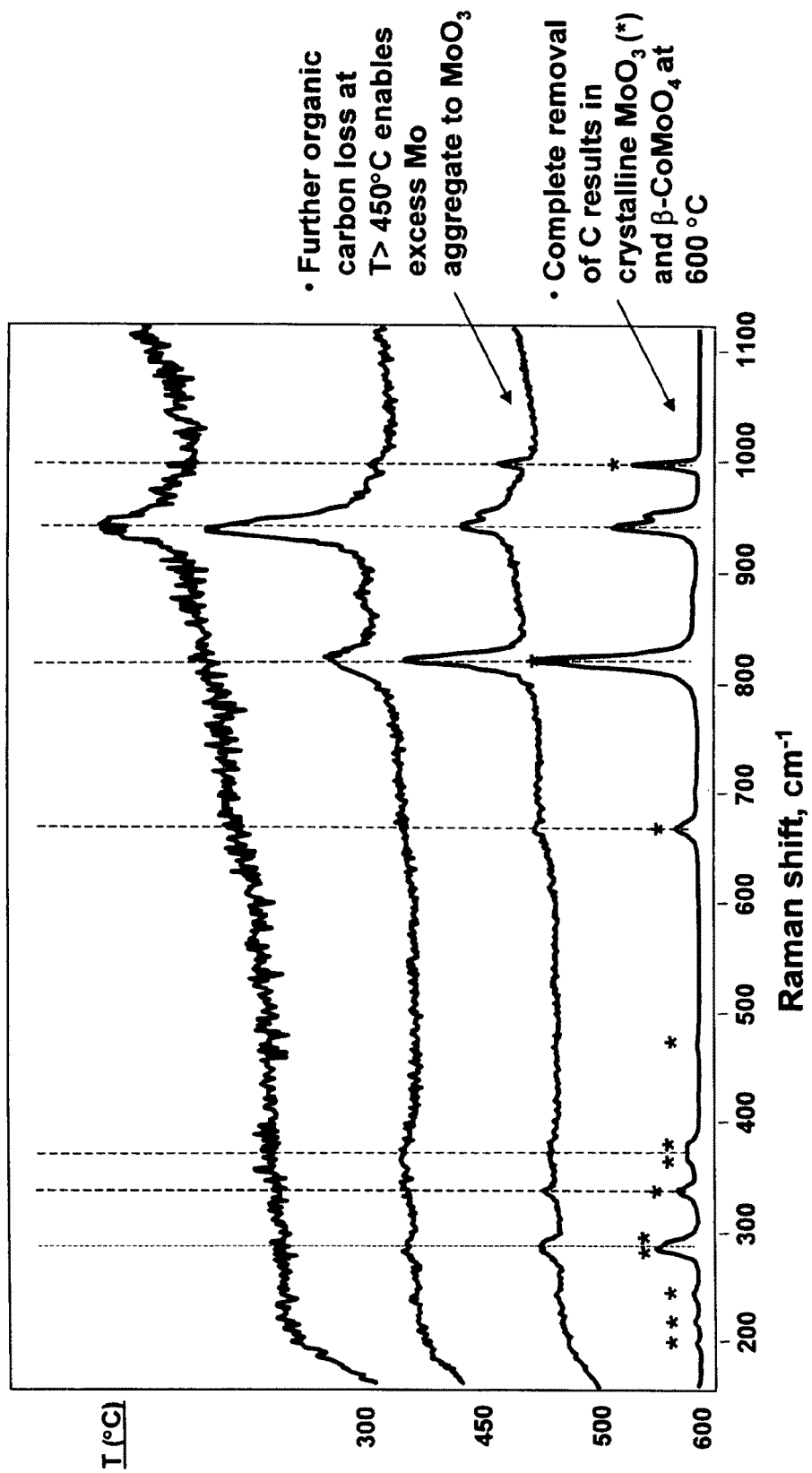
FIG. 21 depicts Raman spectra for catalyst precursors subjected to various heating profiles.

FIG. 21 depicts Raman spectra of a bulk CoMo catalyst precursor thermally treated at 325° C. in air when the catalyst precursors are exposed to higher temperature heat treatments in a Temperature Programmed Oxidation study. The top spectrum in FIG. 21 corresponds to a bulk catalyst precursor exposed to 300° C. in the presence of air. This spectrum potentially shows some disordered $CoMoO_4$, but otherwise no crystalline oxides. The next spectrum shows a catalyst precursor exposed to 450° C. The signal strength for the $CoMoO_4$ is stronger in this spectrum. It is believed that this represents the beginning of agglomeration of Co and Mo due to removal of carbonaceous or organic compound-based material. At 550° C., excess Mo is beginning to aggregate to form a $MoO_3$ phase within the catalyst precursor. This is believed to be due to further loss of carbonaceous material from the precursor. Finally, at 600° C., a substantial majority of the carbonaceous material has been removed. At this point, a crystalline $MoO_3$ phase and β-$CoMo_4$ phase are clearly visible in the spectrum, as indicated by the starred (*) peaks.

This Raman result is consistent with FIG. 14 and FIG. 15, where the strongly interacting glyoxylic acid or its components starts to decompose when temperature is greater than 450° C. It is also consistent with X-ray Diffraction (XRD) results shown in FIG. 22.

Figure 22:
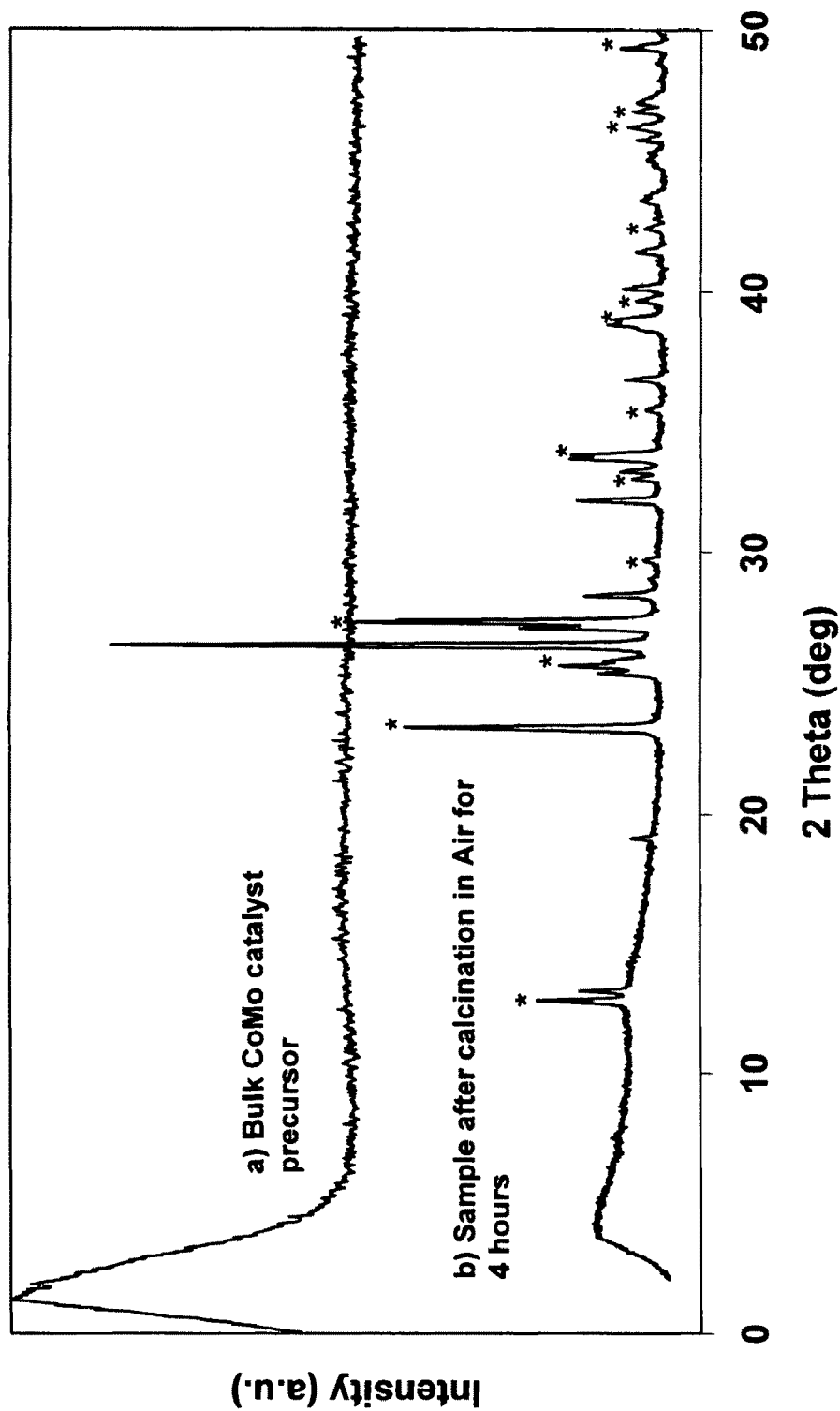
FIG. 22 depicts XRD of catalyst precursors calcined at varying temperatures.

FIG. 22 provides a comparison of XRD results between a bulk CoMo catalyst precursor (formed through thermal treatment in air at 325° C.) and the same sample but heated to 600° C. in air for 4 hours. For the catalyst precursor heated to 325° C., which corresponds to plot a) in the figure, no identifiable crystalline phase is detected by XRD. In contrast, the XRD of the higher temperature treated sample (at 600° C., where a substantial majority of the carbonaceous material has been removed from the catalyst precursor) shows definitive crystalline morphology. The crystalline peaks in the XRD spectra are attributed to $MoO_3$ (designated with*) and $CoMoO_4$ crystalline phases.

EXAMPLE 13

Variations in Ratio of Organic to Metal

A series of precursor solutions similar to the solutions from Examples 1 and 1B were formed with varying ratios R/(Co+Mo). All of the samples were prepared using 1 M Co acetate, 1 M AHM, and 4.5 M glyoxylic acid. The following table shows the solutions that were prepared, along with characterization data of the resulting catalyst precursors. Note that for the BET surface area measurements, a degas procedure was carried out in helium at 200° C. The thermogravimetric analysis (TGA) was carried out in air from room temperature up to 600° C. at a 10° C./minute ramping rate. All of the samples shown in Table 6 below produced an amorphous XRD pattern.

TABLE 6

| R/(Co + Mo) | BET SA ($m^2/g$) | Solid Content by TGA (wt %) | C Content (wt %) |
| --- | --- | --- | --- |
| 2.40 | <1 | 76.7 | 13.2 |
| 2.88 | <1 | 75.9 | 14.8 |
| 3.36 | <1 | 72.4 | 16.6 |
| 3.84 | <1 | 70.2 | 19.0 |
| 4.32 | <1 | 68.6 | 19.6 |
| 5.28 | 14.7 | 68.9 | 21.1 |
| 5.76 | 10.6 | 65.2 | 23 |
| 6.24 | 3.7 | 62.3 | 24.8 |
| 6.72 | 7.8 | 61.5 | 25.5 |

Figure 23:
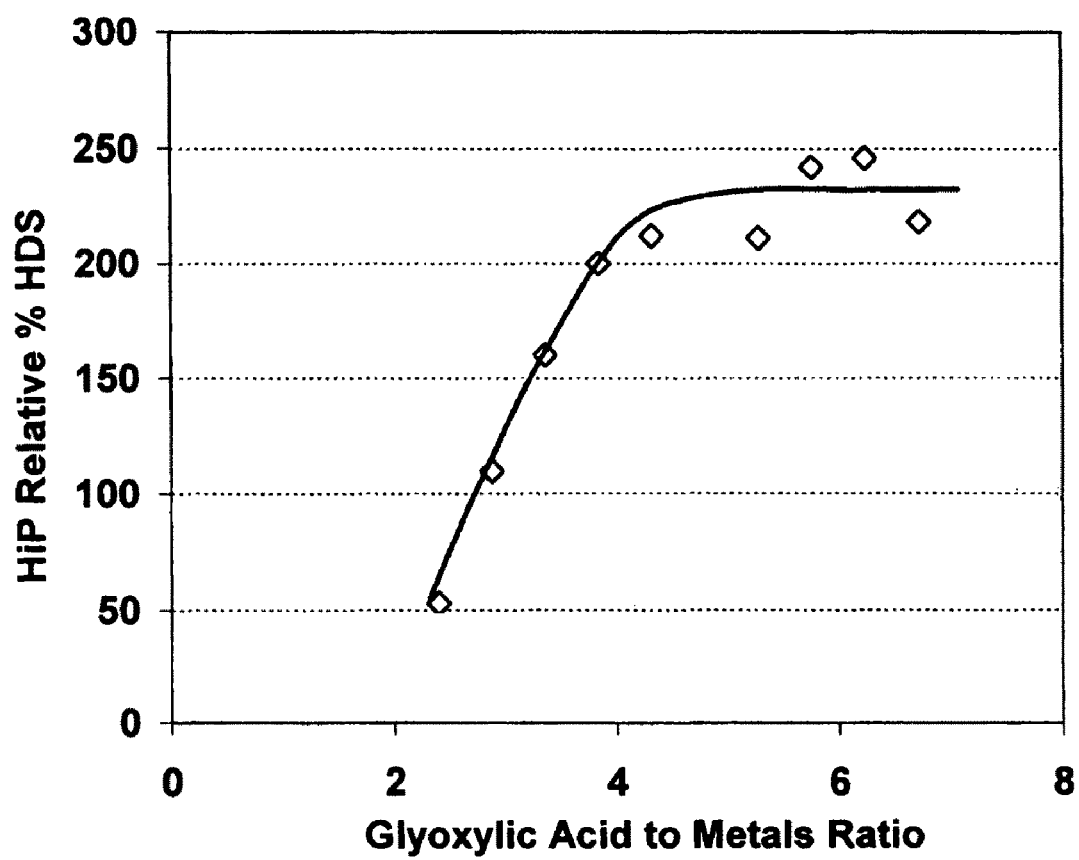
FIG. 23 depicts catalyst activity as a function of the amount of organic complexing agent used to form a catalyst precursor.

The precursors in the above table were then sulfided and compared for relative hydrodesulfurization activity. FIG. 23 shows that precursors formed with glyoxylic acid to metals ratio of about 4 or greater provided better hydrodesulfurization activity in the corresponding sulfided catalyst.

For other organic complexing agents, the amount of organic complexing agent necessary to achieve improved reactivity may be at a ratio of organic complexing agent to metals of 0.5 or greater, or 1.0 or greater, or 2.0 or greater, or 3.0 or greater, or 4.0 or greater, or 5.0 or greater.

EXAMPLE 14

Preparation from Solid Mixtures

The catalyst precursors of the claimed invention can also be prepared from solid mixtures. In the following examples, catalyst precursors were prepared by mixing and grinding the solids of cobalt acetate, AHM, and glyoxylic acid monohydrate. For the first example, the ground mixture was then calcined at 325° C. for 4 hours and showed partially crystallized phases in an XRD analysis. In another preparation, after grinding the mixture was placed in an autoclave for 24 hours at a temperature of either 80° C. or 95° C. The precursors were then calcined at 325° C. for 4 hours. The resulting catalyst precursors had a primarily amorphous XRD pattern. In still another preparation, the mixed solids were ground in the presence of a water mist and then calcined. The water mist during grinding added roughly 10 wt % of water to the mixed solids. This resulted in a precursor with a substantially amorphous XRD pattern. The various precursors are described in Table 7 below.

TABLE 7

| Solid Mixing Samples | BET SA (m²/g) | Solid by TGA (wt %) | C Content (wt %) |
|---|---|---|---|
| Grinding | <1 | 70.6 | 19.2 |
| Grinding and autoclave at 80° C. | 10.4 | 63.5 | 20.3 |
| Grinding and autoclave at 95° C. | 15.4 | 60.9 | 20.6 |
| Grinding and misting | <1 | 69.7 | 21.1 |

EXAMPLE 15

Bulk CoMo-C Samples with Various Organics

Catalyst precursors were prepared using the organics indicated in the table below in place of glyoxylic acid. Otherwise, the precursors were prepared according to the method in Example 1. The ratio of organic to metal is 4.8 in each example except for the second ketoglutaric acid example, where the ratio was 2.4. Note that the acetic acid and formic acid represent comparative examples, due to the low carbon content of the resulting precursor.

| Precursors | BET SA (m²/g) | Solid by TGA (wt %) | C Content (wt %) | XRD |
|---|---|---|---|---|
| Glyoxylic acid | <1 | 66.3 | 21.9 | Amorphous |
| Acetyl acetonate | <1 | 73.3 | 20 | Amorphous |
| Maleic acid | <1 | 50.0 | 32 | Primarily amorphous, some crystalline character (MoO₃ phase) |
| Acetic acid | 22 | 98.7 | 0.35 | Crystallized (CoMoO₄ phase) |
| Formic acid | 19 | 100.5 | 0.14 | Crystallized (MoO₃ phase) |
| Gluconic acid | <1 | 24.1 | 57.9 | Amorphous |
| Glucose | <1 | 24.1 | 60.4 | Amorphous |
| Ketoglutaric acid | <not measured> | | 46.3 | Amorphous |
| Ketoglutaric acid (2.4) | <not measured> | | 37.4 | Amorphous |

EXAMPLE 16

Bulk CoMo-C Samples from Mixtures of Organic Acids

Acid catalyst precursors according to the invention can also be prepared using mixtures of organic complexing agents, such as mixtures of organic acids. As an example, catalyst precursors were prepared by using a combination of glyoxylic and pyruvic acids as the organic complexing agent, along with cobalt acetate and AHM. The mixtures were dried under vacuum at 60° C. overnight, then at 120° C. in air, and finally at 400° C. in $N_2$ for 4 hours. The relative amount of Co to Mo was maintained at 1:2. The ratio of total organic complexing agent to total metals (Co+Mo) for each precursor was 4.8. The ratio of glyoxylic acid to pyruvic acid used in the mixed organic complexing agent is indicated in the table. Each of the samples described in the table produced an amorphous XRD pattern.

| Samples | XRD | C Content (wt %) |
|---|---|---|
| CoMo—C (Glyoxylic:Pyruvic = 2.65) | Amorphous | 29.3 |
| CoMo—C (Glyoxylic:Pyruvic = 1.20) | Amorphous | 40.1 |
| CoMo—C (Glyoxylic:Pyruvic = 0.57) | Amorphous | 37.4 |

EXAMPLE 17

Aromatic Selectivity 4,6-diethyldibenzothiophene (DEDBT) is a model compound that can be used to investigate selectivity for preserving aromatics during hydrodesulfurization. When 4,6 DEDBT is hydrodesulfurized, two primary products are formed:

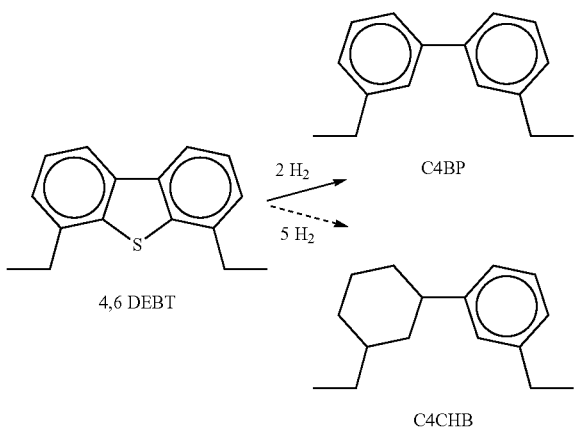

The C4CHB product requires substantially more H$_2$ to form, and therefore is less desirable from a processing standpoint. A catalyst that favors formation of the C4BP compound over the C4CHB compound is preferable. The selectivity of a catalyst can be expressed in terms of the ratio between the wt % of C4CHB and the wt % of C4BP.

A model compound study was performed to investigate the relative aromatic selectivity of catalysts made according to the invention versus a commercial catalyst. A dodecane model feedstock was spiked with 1.5 wt % of 4,6 diethyldibenzothiophene (4,6 DEDBT). The feedstock was treated in a three phase reactor at 265° C., 250 psig of H$_2$, and an H$_2$ flow rate of 650 SCF/B. The feedstock was treated in the presence of a catalyst corresponding to Catalyst A in Example 1, and separately in the presence of KF-757™, a commercially available catalyst made by Albemarle Catalyst Company. The feed and products were analyzed using GC-Mass Spectrometry. The feedstock treated according to the invention had a C4CHB/C4BP ratio of 9, while the feedstock treated with the KF-757™ had a ratio of 25. This demonstrates that the catalyst according to the invention provided a better relative activity for the reaction pathway leading to direct desulfurization (i.e., formation of C4BP).

EXAMPLE 18

Retaining Carbon in the Catalyst Precursor and Sulfided Catalyst

Figure 24:
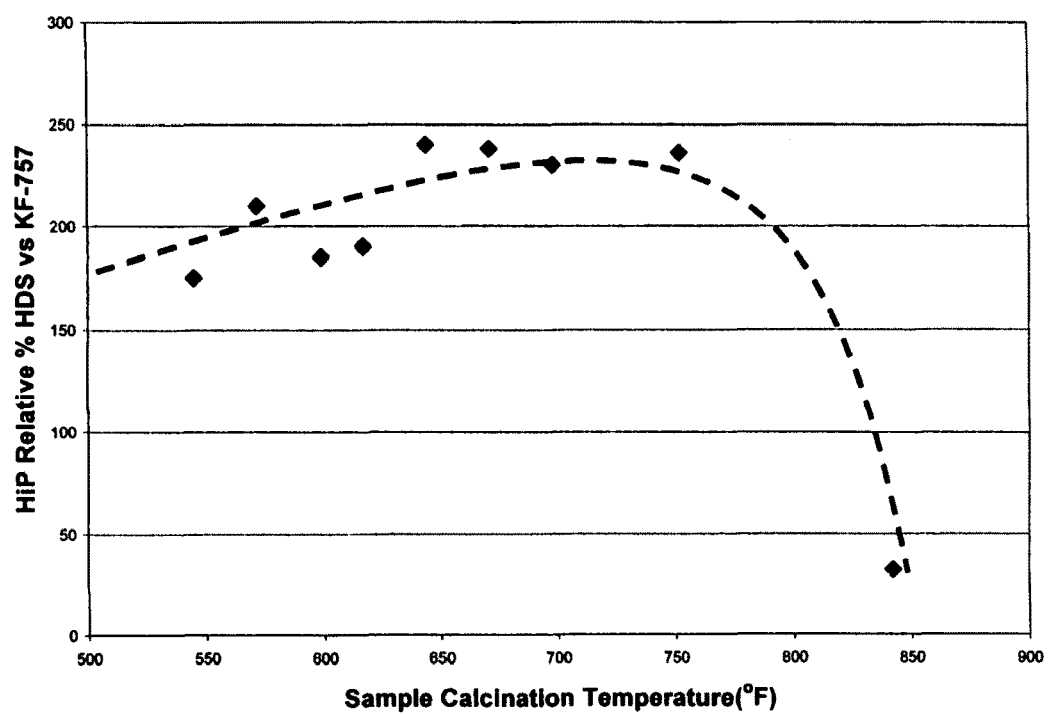
FIG. 24 depicts relative activity of catalyst precursors calcined at varying temperatures.

It is believed that the organic compound based component in the catalyst precursor and sulfided catalyst is important for maintaining the improved reactivity of the catalyst. FIG. 24 shows the relative HDS performance for catalyst precursors that are calcined at various temperatures prior to sulfidation. In FIG. 24, catalyst precursors that are calcined at temperatures below 775° F. (413° C.) show an activity of roughly 200% of the activity of a reference KF-757™ catalyst. Preferably, the catalyst precursor can be calcined at a temperature from about 625° F. (329° C.) to about 775° F. (413° C.). For temperatures above 825° F. (440° C.) for calcinations of the precursor, the carbon content may be driven off, resulting in the lower activity shown.

Carbon is also retained in the catalyst according to the invention after sulfidation. The table below shows the carbon content for a catalyst precursor prior to sulfidation, and the catalyst after liquid phase sulfidation with H$_2$S/H$_2$ at 500 psig.

| Bulk CoMo—C | Before sulfidation | After sulfidation |
|---|---|---|
| Wt % C | 22.0 | 15.4 |
| Wt % S | 0 | 32.0 |

Figure 25:
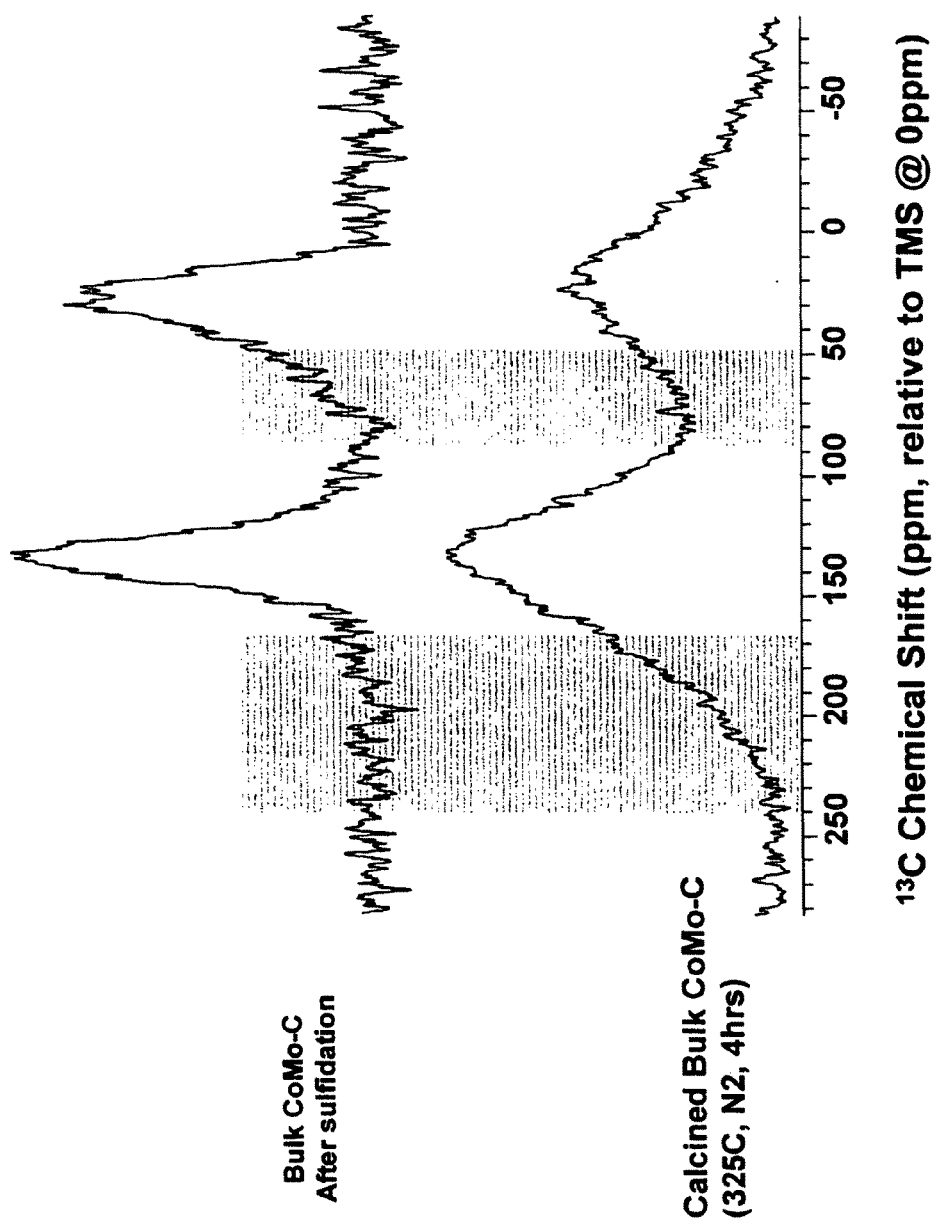
FIG. 25 depicts a $^{13}C$ NMR plot of a catalyst precursor and the corresponding catalyst after sulfidation.

Further evidence that carbon remains after sulfidation can be provided by $^{13}$C NMR of a catalyst precursor and a corresponding sulfided catalyst. FIG. 25 shows the overall similar $^{13}$C NMR profiles of a catalyst according to the invention before and after sulfidation. Note that the changes in the $^{13}$C NMR profiles in the region of about 170-230 ppm (characteristic of C=O from aldehyde and acid functionalities) and in the region of about 40-80 ppm (characteristic of C—O) are consistent with replacement of oxygen atoms by sulfur atoms during sulfidation.

What is claimed is:

1. An amorphous bulk metallic catalyst precursor composition comprising a) cobalt, b) molybdenum or tungsten, and c) from at least about 20 wt. % to about 60 wt. % of a carbon-containing compound based on a carboxylic acid-containing organic complexing agent, the catalyst precursor composition having a surface area of 16 m$^2$/g or less based on BET.

2. The catalyst precursor composition of claim 1, wherein the surface area is less than about 10 m$^2$/g.

3. The catalyst precursor composition of claim 1, wherein the surface area is at least 0.1 m$^2$/g.

4. The catalyst precursor composition of claim 1, wherein the precursor composition comprises an additional transition metal.

5. The catalyst precursor composition of claim 4, wherein the additional transition metal is Ni, or Zn.

6. A sulfided bulk metallic catalyst comprising a) cobalt, b) molybdenum or tungsten, and c) at least about 10 wt. % carbon content, wherein the catalyst is formed by sulfiding an amorphous catalyst precursor composition comprising 1) cobalt, 2) molybdenum or tungsten, and 3) from at least about 20 wt. % to about 60 wt. % of a carboxylic acid-containing organic complexing agent, the catalyst precursor composition having a surface area of 16 m$^2$/g or less based on BET.

7. The sulfided bulk metallic catalyst of claim 6, wherein the catalyst precursor comprises at least about 12 wt. % carbon content.

8. The sulfided bulk metallic catalyst of claim 6, wherein the catalyst precursor comprises about 25 wt. % or less carbon content.

9. The sulfided bulk metallic catalyst of claim 6, wherein at least a portion of the Group VIB metal is in the form of stacks of metal sulfide having a stack height of from about 1.2 to about 2.5.

10. The sulfided bulk metallic catalyst of claim 9, wherein the stack height is about 2.2 or less.

11. The sulfided bulk metallic catalyst of claim 9, wherein the stack height is about 2.0 or less.

12. The sulfided bulk metallic catalyst of claim 6, wherein the precursor composition comprises an additional transition metal.

13. The sulfided bulk metallic catalyst of claim 12, wherein the additional transition metal is Ni, or Zn.

14. The sulfided bulk metallic catalyst of claime 6, wherein the surface area of the catalyst precursor composition is less than about 10 m$^2$/g.

15. An amorphous catalyst precursor composition comprising a) cobalt, b) molybdenum or tungsten, c) carbon atoms from a carboxylic acid-containing organic complexing agent, and d) oxygen atoms, such that the catalyst precursor composition exhibits a carbon content from about 10 wt % to about 25 wt %, a ratio of cobalt to molybdenum or tungsten from about 0.2 to about 0.6, and a surface area of about 16 $m^2/g$ or less.

16. The catalyst precursor composition of claim 15, wherein the composition exhibits infrared spectrum peaks at frequencies for carboxylate groups in the range of about 1400 $cm^{-1}$ to about 1650 $cm^{-1}$ and at frequencies for carbonyl groups in the range of about 1700 $cm^{-1}$ to about 1900 $cm^{-1}$.

17. The catalyst precursor composition of claim 15, wherein the ratio of cobalt to molybdenum or tungsten is from about 0.3 to about 0.6.

18. The catalyst precursor composition of claim 15, wherein the surface area is less than about 10 $m^2/g$.

19. The catalyst precursor composition of claim 15, wherein the surface area is at least about 0.1 $m^2/g$.

\* \* \* \* \*